US005615227A

United States Patent [19]
Schumacher, Jr. et al.

[11] Patent Number: 5,615,227
[45] Date of Patent: Mar. 25, 1997

[54] TRANSMITTING SPREAD SPECTRUM DATA WITH COMMERCIAL RADIO

[75] Inventors: Robert G. Schumacher, Jr.; Eugene A. Janning, Jr., both of Cincinnati, Ohio

[73] Assignee: Pole Zero Corporation, West Chester, Ohio

[21] Appl. No.: 342,902

[22] Filed: Nov. 21, 1994

[51] Int. Cl.$^6$ .................................................. H04B 1/707
[52] U.S. Cl. ........................................................... 375/206
[58] Field of Search ...................................... 375/200, 205, 375/206, 362, 364, 368, 208, 209, 210; 370/18, 19, 105.5

[56] References Cited

U.S. PATENT DOCUMENTS

| | | | |
|---|---|---|---|
| 5,260,967 | 11/1993 | Schilling | 375/205 |
| 5,442,627 | 8/1995 | Viterbi et al. | 375/205 X |
| 5,467,367 | 11/1995 | Izumi et al. | 375/206 |

OTHER PUBLICATIONS

Robert C. Dixon, "Coding for Communications and Ranging" Spread Spectrum Systems With Commercial Applications, John Wiley & Sons, Inc., NY, ISBN 0-471-59342-7.

Author Unknown, "Generation of PN Sequences" Section 8.2.3. Digital Communications.

Analog Devices, Inc., "Analog Device AD640 Logarithmic Amplifier" Data Sheet and Application Notes.

Primary Examiner—Stephen Chin
Assistant Examiner—Kevin Kim
Attorney, Agent, or Firm—Wood, Herron & Evans, P.L.L.

[57] ABSTRACT

A transmitter prepares digits for transmission, e.g. as spread spectrum data accompanying commercial radio, using code sequences having exactly zero cross-correlation. The code sequences include phased versions of the maximal length sequence, with an additional "0" bit appended to the end of each phased version. Information signals (which may be analog signals, or digital signals encoded as two or more analog levels) are transmitted by multiplying each information signal by one of the code sequences, and adding the resulting sequences together to form an output sequence for transmission. A receiver that recovers the information signals correlates the received sequence with each of the code sequences, producing results which are directly proportional to the information signals.

82 Claims, 9 Drawing Sheets

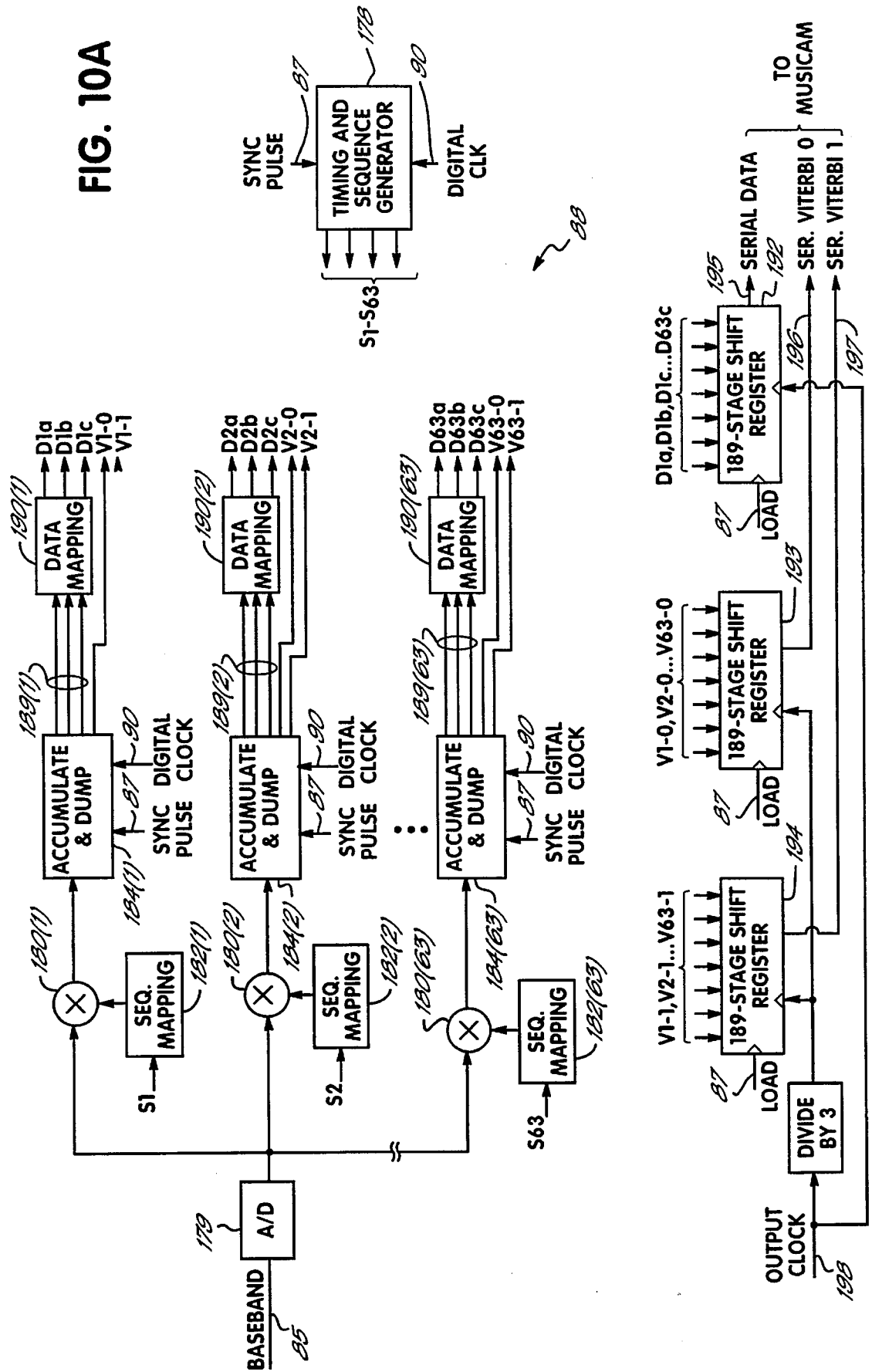

TRANSMITTING SPREAD SPECTRUM DATA WITH COMMERCIAL RADIO

FIELD OF THE INVENTION

This invention relates to combining spread spectrum transmissions with commercial radio transmissions.

BACKGROUND OF THE INVENTION

The commercial radio spectrum is populated by government-licensed commercial radio stations operating at designated center frequencies. For example, the FM radio spectrum is segregated into 102 channels in the range of 87.5 MHz to 107.9 MHz, the channels being evenly spaced at 0.2 MHz intervals. To prevent interference, each radio station is allocated a portion of frequency space or bandwidth around its designated center frequency. The FCC has specified a "mask" identifying the amount of transmitting power a station may produce at each wavelength; most of the transmitting power must be near to the center frequency; progressively lower power is permitted at wavelengths away from the center frequency.

There is increasing interest in using bandwidth available to FM stations to transmit additional information, such as digital broadcast data; this is known as an In Band On Channel (IBOC) transmission. Typically, additional information would be added to the FM transmission by modulating the amplitude of the FM carrier signal, or by summing a non-interfering signal within the allowed mask, resulting in additional transmission power in sidebands surrounding the existing 0.2 MHz band of FM program material.

One known technique for transmitting digital data over a radio channel is known as Code Division Multiple Access (CDMA) transmission. This technique is used to transmit subsignals of digital information from multiple transmitters over a single channel for reception by multiple receivers at different and possibly mobile locations.

To send each positive or negative digital signal of the subsignal, a CDMA transmitter respectively sends a code sequence or an inverted version of the code sequence. Typically, the code sequence is itself a sequence of digital signals each having a positive or negative value; to send the code sequence, a first analog output level is transmitted for every positive digital signal in the code sequence and a second analog output level is transmitted for every negative digital signal in the code sequence. To send an inverted version of the code sequence, the first output level is transmitted for every negative digital signal in the code sequence, and the second output level is transmitted for every positive digital signal in the code sequence.

A receiver selects a desired CDMA transmission by correlating the signals it receives on the CDMA channel with an internally-generated version of the desired code sequence used by the desired transmitter. To correlate the signals, the receiver first multiplies the analog signals received on the CDMA channel by the desired code sequence, i.e., the received signal is inverted during negative digital signals of the desired code sequence and not inverted during positive digital signals of the desired code sequence, producing a product signal. To complete the correlation, the receiver maintains a summation of the product signal over the sequence period. When the receiver reaches the end of the desired code sequence, the receiver uses the accumulated sum to determine the value of the transmitted digit, returns to the beginning of the desired code sequence, and clears the sum to zero. If the internally-generated desired code sequence is in phase with the code sequences produced by the transmitter, the sum will be a large positive or negative number, corresponding to a positive or negative digital signal of the subsignal from the desired transmitter.

For such a scheme to work properly, the code sequences used by the CDMA transmitters must satisfy two requirements: first, the code sequences must be approximately orthogonal to each other. Approximately orthogonal digital signal sequences have approximately the same number of unequal digital signals as equal digital signals (comparing corresponding digital signals from each sequence) when compared in any phase to each other. Two sequences having this property relative to each other will be referred to as having near-zero cross-correlation. This requirement arises from the fact that the code sequences are transmitted by multiple transmitters at different locations, and therefore receivers located in different geographical positions relative to the transmitters will receive sequences in substantially different phase relationships. Requiring approximately orthogonal sequences ensures that, when a receiver correlates the signals on the CDMA channel with a desired code sequence, any other code sequences on the CDMA channel, regardless of their relative phase, will have minimal impact on the correlation performed in the receiver.

The second requirement is that the CDMA code sequences must have near-zero auto-correlation; that is, each sequence, when compared to any out-of-phase version of itself (i.e., a version formed by repetitively barrel-shifting the last digital signal of the sequence to the beginning of the sequence), must have approximately the same number of equal digital signals as unequal digital signals. This requirement ensures that a receiver can synchronize its internally-generated code sequence to the code sequences being transmitted by the transmitter. If the internally-generated code sequence is out of phase with that being transmitted by the transmitter, when the internally-generated code sequence is correlated to the signal received on the CDMA channel, an approximately zero result will be obtained. However, if the internally-generated code sequence is in phase with the transmitter, the correlation will produce, as noted above, a relatively large positive or negative result. Thus, the receiver may synchronize to the transmitter by slowly varying the phase of the internally-generated code sequence, until large positive and negative results are obtained.

So-called "Gold" code sequences have near-zero out-of-phase autocorrelation and cross-correlation, and thus are suitable candidates for CDMA transmission. Gold code sequences can be derived from known mathematical formulas. However, neither Gold code sequences, nor any other known set of sequences used in CDMA transmission, have perfect orthogonality (i.e., when phased versions of two Gold code sequences are compared, there is never exactly the same number of equal and unequal bits). Rather, Gold code sequences and other sequences used in CDMA transmission are only approximately orthogonal. However, Gold code sequences are closer to the orthogonal ideal than other types of sequences, and therefore are often used in CDMA systems.

Another type of code sequence is the "maximal length" code sequence. The out-of-phase autocorrelation of a maximal length code sequence is typically much lower than a Gold code sequence, however, sets of maximal length sequences have greater cross-correlation than sets of Gold code sequences; thus CDMA systems typically use Gold code sequences rather than maximal length code sequences.

Maximal length code sequences, and other forms of code sequences, are described in *Spread Spectrum Systems with*

*Commercial Applications* by Robert C. Dixon, John Wiley & Sons, Inc., New York, ISBN 0-471-59342-7, in particular in the chapter entitled "Coding for Communications and Ranging".

One difficulty with CDMA schemes is that they exhibit limited throughput; that is, the number of sequences is much larger than the number of digital signals, or bits, in the sequences. For example, it is believed that there are less than seven different 63-bit sequences having sufficient cross-correlation and autocorrelation characteristics to be used in a conventional CDMA environment (sets of four or more 63-bit sequences can be generated, but the sequences are not believed to demonstrate the necessary orthogonality and autocorrelation for a robust system). Therefore, using 63-bit sequences in conventional CDMA techniques, only 3 sequences can be simultaneously transmitted, limiting the rate at which digital signals of the subsignal which can be transmitted.

SUMMARY OF THE INVENTION

The present invention provides a spread spectrum transmission system having substantially improved throughput. For example, in accordance with principles of the present invention, 63 64-bit sequences may be simultaneously transmitted over one channel, greatly increasing the throughput as compared to a traditional CDMA scheme.

In the environments described below, all of the sequences representing information are transmitted from the same transmitter, and all of the transmitted sequences may be received in the same phase relative to each other, regardless of the geographical position of the receiver. As a result, in accordance with principles of the present invention, the conventional CDMA requirement of near-zero out of phase cross-correlation can be met by different phases of a single sequence having near-zero out-of-phase autocorrelation.

Suitable sequences may be formed from a maximal-length sequence, because a maximal-length sequence has near-zero autocorrelation. Furthermore, in accordance with principles of the present invention, a maximal-length sequence can be improved to produce a sequence having exactly zero autocorrelation. This is done by starting with a maximal length sequence composed of N digital signals (i.e., bits) having the values +1 and −1, producing N different phases $s_i$ of the sequence $s_1, s_2, \ldots s_{63}$ by repetitive barrel shifting, and then adding an extra bit with a predetermined value to a predetermined location of each phase $s_i$. For simplicity, the additional bit can be placed at the beginning of the phases, although any other location will work equally well so long as the location is the same in each phase.

Thus, for example, given an N-bit maximal length sequence of bits $b_1, b_2, b_3, \ldots, b_{N-1}, b_N$ and an extra predetermined bit $b_p$, in accordance with principles of the present invention, one forms N, N+1 bit sequences:

$b_p, b_1, b_2, b_3, \ldots, b_{N-1}, b_N$ $b_p, b_N, b_1, b_2, \ldots, b_{N-2}, b_{N-1}$ $b_p, b_{N-1}, b_N, b_1, \ldots b_{N-3}, b_{N-2}$ $b_p, b_2, b_3, b_4, \ldots, b_N, b_1$ The extra predetermined bit can be chosen so that each resulting sequence of N+1 bits has exactly (N+1)/2 bits of value +1 and (N+1)/2 bits of value −1, such that the resulting sequences, unlike those used in any known spread spectrum system, have exactly zero cross-correlation.

Thus, specifically, in accordance with one feature of the present invention, a set of information signals is encoded for spread spectrum transmission by first generating two or more code sequences having exactly zero cross-correlation. Transmission sequences may be produced by multiplying each orthogonal sequence by one or more of the information signals to be transmitted. Then the transmission code sequences are summed together to form an encoded output code sequence.

In accordance with another feature of the present invention, a set of information signals are encoded for transmission by selecting a code sequence which includes a group of digital signals having near-zero out-of-phase autocorrelation, and generating additional code sequences in which the group of digital signals has been shifted in phase. Then, transmission code sequences are produced by multiplying each code sequence by words of one or more of the digital signals to be transmitted. Finally, the transmission code sequences are summed together to form an output code sequence.

In the following, the transmitted signal produced by this summing of sequences is termed a "code shift multiplex" (CSM) signal.

In specific embodiments, the code sequences are phases of a maximal length code sequence of N digital signals (i.e., bits) having the possible values +1 or −1, each modified to include an additional digital signal (i.e., bit), at its end. The sequences formed in this manner have zero correlation with each other, and thus all of the code sequences may be transmitted together in the manner described with perfect mathematical orthogonality.

In various embodiments, each information signal to be transmitted may be a level selected from a set of possible levels, which can be either evenly or unevenly spaced. An information signal comprised of a single digital bit can be transmitted using two levels (interpreted as having the possible values +1 and −1). An information signal comprised of two digital bits can be transmitted using four levels (interpreted, for example, as having the possible values +3, +1, −1, −3). An information signal of three digital bits can be transmitted using eight levels (interpreted, for example, as having the possible values +7, +5, +3, +1, −1, −3, −5, −7). Any other system of discrete levels may also be transmitted, and the levels may be evenly or logarithmically spaced. Furthermore, an analog information signal, i.e., a signal which has a level within a continuous range of possible levels, can also be transmitted.

Due to the exactly zero cross-correlation between the sequences, in theory any of the above signals can be transmitted with equal fidelity. However, in a practical application, due to noise, distortion and other limitations, greater transmission accuracy is achieved when a smaller set of possible levels is transmitted. Thus, the greatest transmission accuracy is achieved when only two levels are transmitted. However, greater thruput bandwidth can be achieved when a larger number of levels is permitted. This tradeoff between thruput bandwidth and accuracy must be optimized for each application.

To facilitate reception of the transmitted output sequence, the output code sequence can include a synchronization pulse identifying, e.g., the beginning of the output sequence.

The above described method can also be enhanced to simultaneously transmit a second set of information signals by preparing the second signals in the same manner as the first signal to form a second output signal for transmission, and then transmitting the two output signals in phase quadrature on a high frequency carrier. Alternatively, the second set of information signals can be encoded using a different set of code sequences which have near-zero out-of-phase cross-correlation both with respect to each other and with respect to the first code sequences. Then the two output signals can be added and transmitted together in phase on the carrier.

In accordance with another feature of the invention, a method of extracting information from a received CSM signal includes generating code sequences in the manner described above, producing correlation sequences by forming a sequence of products of the received signal with the code sequences, forming correlation values by summing the correlation sequences over a time interval, and determining the information from the correlation values.

In a specific embodiment, a synchronization pulse at the beginning of the received signal is detected and used to initiate the time interval.

In one embodiment, described in detail below, the encoder and extractor are respectively coupled to an FM transmitter and receiver to transmit and received in-band on-channel (IBOC) information by amplitude modulation of an FM carrier. However, the principles of the present invention can be applied to any kind of spread spectrum transmitting and receiving system.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 10A is a general diagram of the functions performed in the baseband demodulator 88 of FIG. 5.

DETAILED DESCRIPTION OF SPECIFIC EMBODIMENTS

Figure 1:
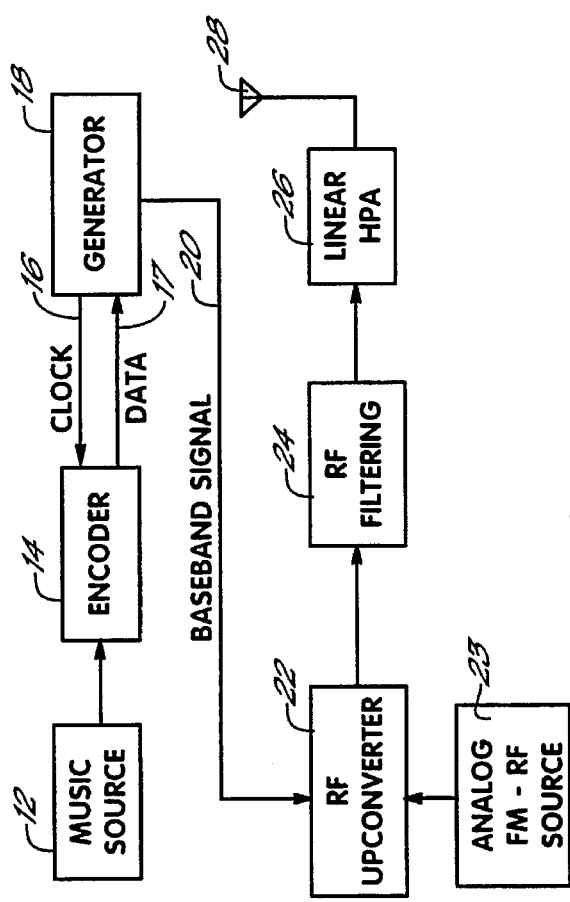
FIG. 1 is a block diagram of an FM transmitter with an in band on channel (IBOC) digital subsystem in accordance with principles of the present invention.

FIG. 1 illustrates an FM transmitter incorporating a CSM encoder for IBOC digital transmission in accordance with principles of the present invention. A source 12, for example of program music and/or advertising, feeds into an encoder 14 which converts the analog signal from source 12 into digital data. Encoder 14 may be an analog-to-digital converter, or it may include more elaborate digital signal processing circuitry which conditions and/or compresses the digital data. Alternatively, instead of transmitting digitized audio, the CSM digital transmission system may transmit digital information, such as teletype news, in which case no analog-to-digital conversion would be required. In any case, the information to be transmitted is a group of digital signals (i.e., bits) on line 17 which is in synchrony with a clock signal produced by generator 18 on line 16. The data bits are encoded in accordance with principles of the present invention by generator 18 into an analog signal (which hereinafter may be referred to as a "baseband CSM" signal) on line 20; this analog signal has a waveform of the kind illustrated in FIG. 2. RF upconverter 22 modulates the analog signal on line 20 with the standard, analog RF FM signal (including the standard FM program material) produced by source 23. If necessary the resulting RF signal is filtered by a broadband filter 24 which ensures that the signal remains within the allowable FM "mask". The filtered signal is then amplified by linear high power amplifier 26 for broadcast on antenna 28. Suitable designs for broadband filter 24 and high power amplifier 26 are well known in the art of radio signal transmission.

Figure 2:
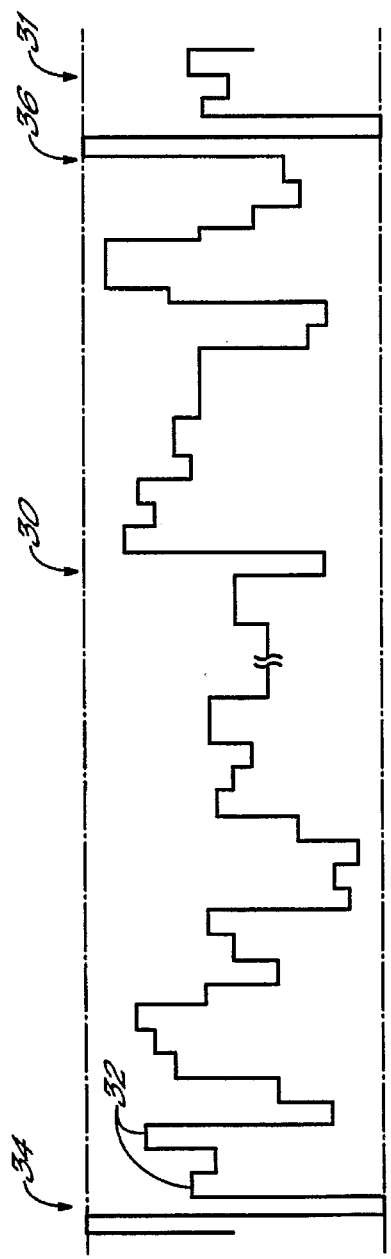
FIG. 2 is an illustrative example of a transmitted sequence produced by the generator 18 of FIG. 1.

FIG. 2 shows the continuously-transmitted output sequences produced by generator 18 in accordance with principles of the present invention. The output sequence 30 comprises a sequence of pulses 32. Each output sequence 30 is followed (and preceded, with the exception of the first sequence) by another output sequence 31. Synchronization pulses 34 and 36 are inserted between each output sequence to aid the receiver in locating the beginning and end of each output sequence for decoding, as discussed below. These synchronization pulses consist of a fixed level positive pulse followed immediately by a fixed level negative pulse, as illustrated by pulses 34 and 36, and thus have no DC content. The fixed levels may be, for example, ¼ of full scale.

Synchronization pulses 34, 36 may have a shorter duration than pulses 32; for example, positive and negative synchronization pulses having a duration which is approximately 60% of the duration of the pulses 32 encoding the data have been used effectively.

Although any frequency can be used, in the specific implementation described below for IBOC transmission of digital data with FM radio, output sequences have been successfully transmitted at a rate of 2 kHz; at this rate, the pulses 32 appear at a rate of approximately 140 kHz, and have a width of approximately 7 microseconds.

Generator 18 is a digital circuit performing various computational functions. It will be appreciated that this circuit can be implemented using discrete logic circuitry, programmable logic array (PLA) devices, custom integrated circuits (e.g., gate array devices), or a microprocessor running under the control of suitable software. Presently, these functions are performed by PLA's, specifically 7000 Series PLA's available from Altera Corporation, 2610 Orchard Parkway, San Jose, Calif. 95134-2020. However, other implementations may be more cost-effective in mass production and are within the scope of the present invention.

The other digital circuitry described below is similarly currently implemented with PLA's, but also might be more cost-effectively implemented with custom digital circuitry or with a microprocessor, and these other implementations are within the scope of the present invention.

Figure 3A:
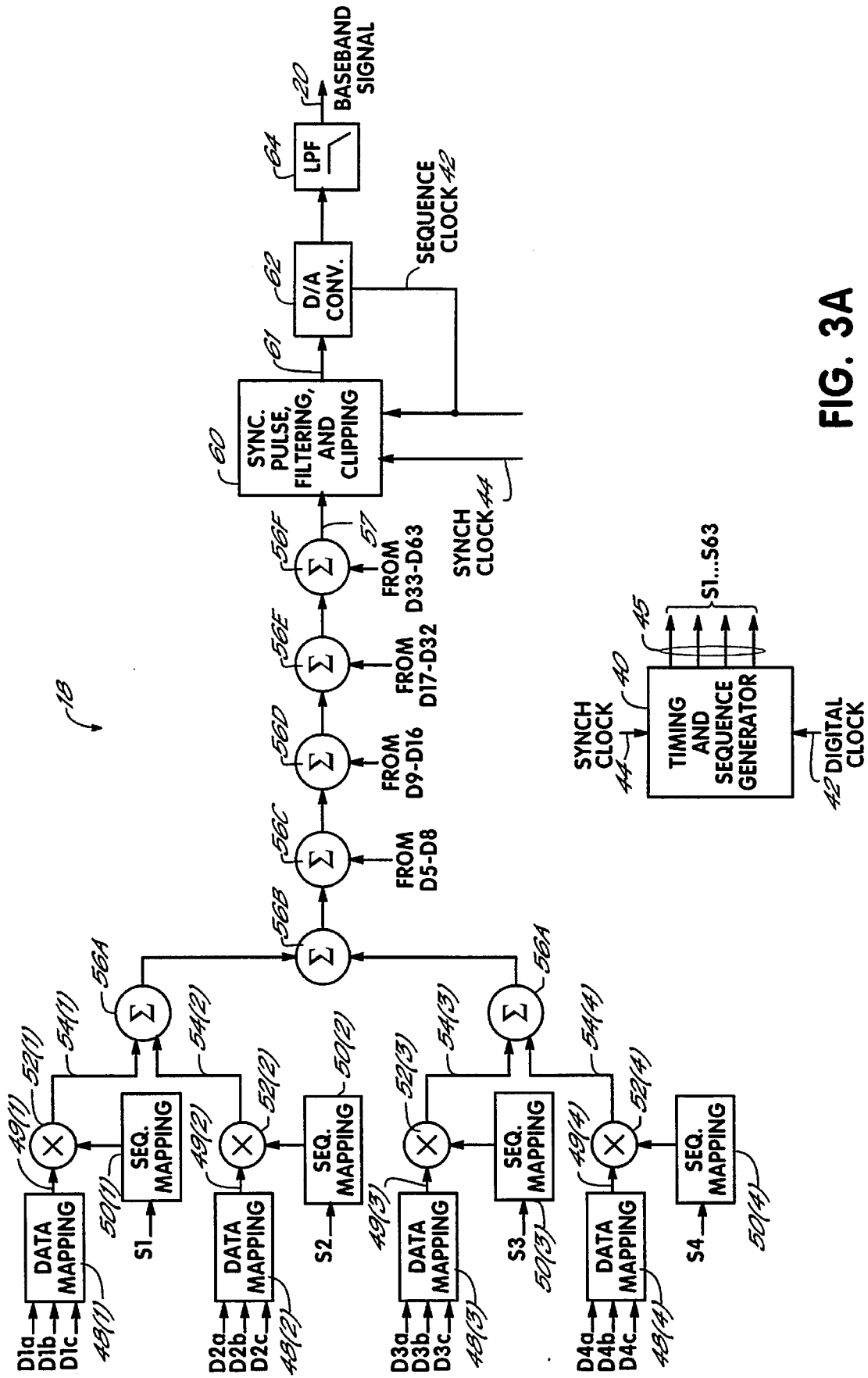
FIG. 3A is a general illustration of the functions performed by the generator 18 of FIG. 1.

Referring to FIG. 3A, generally, encoder 18 includes a circuit 40 which generates, on lines 45, sixty-three 64-bit code sequences (hereafter sometimes referred to as sequences $s_i$) which are used to encode the digital data. Lines 45 carry bits of these sequences in synchrony with a sequence clock on line 42. As noted above, the code sequences $s_i$ are phase-shifted versions of a 63 bit maximal-length sequence, including an additional "0" bit in the same location in each sequence, e.g. at the end of the sequence.

It should be noted that each of these sequences $s_i$ has the same number of 1's and 0's. Furthermore, any two sequences, when compared bit-by-bit to each other, have exactly 32 identical bits and 32 different bits. It can also be verified, based on the foregoing, that, giving each "1" bit a value of positive 1, and every "0" bit a value of negative 1, if one multiplies corresponding bits of two different sequences $s_i$ and adds the products, the result is 0. Those bits which differ will produce a product of $-1$, whereas those bits which are the same will product a product of $+1$; thus, 32 of the products will have the value $-1$, the other 32 products will have the value $+1$, and the sum will be zero. It should be noted, however, that if one performs the same operation on identical phases, the result is 64. If the phases are identical, the individual products will be either $+1 \times +1$ or $-1 \times -1$; in either case the value of the product will be 1, so the sum of the 64 products will be 64. Stated mathematically, $$\sum_{i=1}^{64} s_j(i) \cdot s_k(i) = 64 \text{ for } j = k \quad (1)$$

$$\sum_{i=1}^{64} s_j(i) \cdot s_k(i) = 0 \text{ for } j \neq k$$

where $s_j(i)$ and $s_k(i)$ are the $i^{th}$ bits, respectively, of the $j^{th}$ and $k^{th}$ sequences. This relationship is critical to recovery of the encoded transmission in the receiver.

The circuit discussed herein encodes groups of three adjacent binary digits as base-eight transmission digits t. Thus, triplets of binary digits (referred to respectively as (D1a, D1b, D1c), (D2a, D2b, D2c), etc.) are input to respective data mapping circuits 48(1), 48(2), 48(3), etc. The data mapping circuits convert the triplet of data bits to a single base-8 transmission digit having the possible values $+7$, $+5$, $+3$, $+1$, $-1$, $-3$, $-5$ or $-7$ (these values being represented as four-bit two's complement binary symbols on line 49(1), 49(2), 49(3), etc.) Data mapping circuits 48 consist of logic elements implementing the truth table:

| Dxa | Dxb | Dxc | Result |
| --- | --- | --- | --- |
| 0 | 0 | 0 | $-5$ (1011) |
| 0 | 0 | 1 | $-7$ (1001) |
| 0 | 1 | 0 | $-3$ (1110) |
| 0 | 1 | 1 | $-1$ (1111) |
| 1 | 0 | 0 | $+5$ (0101) |
| 1 | 0 | 1 | $+7$ (0111) |
| 1 | 1 | 0 | $+3$ (0010) |
| 1 | 1 | 1 | $+1$ (0001) |

These values are Grey-coded, that is, the three adjacent bits which form the triplet (Dxa, Dxb, Dxc) are evaluated as if they were encoded in Grey-code format rather than straight binary. This provides error resilience in the receiver decoding process, as will be elaborated below.

The 63 lines 45 carrying sequences $s_i$ respectively connect to one of 63 sequence mapping circuits 50(1), 50(2), 50(3), etc. Circuits 50 map the bits of the sequences into bipolar base-two digits having the possible values $+1$ and $-1$ (these values being represented as two-bit two's complement binary symbols at the outputs of circuits 50). Sequence mapping circuits 50 consist of discrete logic elements implementing the truth table:

| Input | Result |
| --- | --- |
| 1 | $+1$ (01) |
| 0 | $-1$ (11) |

The output of each respective sequence mapping circuit 50 is multiplied by the output of the respective data mapping circuit by a respective two's-complement multiplier 52(1), 52(2), 52(3), etc., producing products on lines 54(1), 54(2), 54(3), etc. These products are fed to a cascading tree structure of two's complement adders 56A–56F. Adders 56 form the sum of each of the products on lines 54 and produce the result on line 57. The sums produced by adders 56A form inputs into adders 56B, the sums of which form inputs to adders 56C, and so on until the final addition is performed by adder 56F.

The final ten bit sum on line 57 represents the value of an output digit, to be encoded as a pulse 32 (FIG. 2), and is a number between $-7 \times 63$ and $+7 \times 63$, represented in two's complement binary.

The foregoing can be better understood by describing these functions mathematically. In the generator circuit, a set of N (N=63) base-8 transmission digits t(1), t(2), ... t(N) (each digit t(i) being derived from a triplet of bits Dxa, Dxb, Dxc) are encoded using N n-bit (n=64) sequence $s_i$, by multiplying each of the N sequences $s_1$, $s_2$ ... $s_N$ by a corresponding one of the transmission digits t(i), and then adding the products to form a sequence of n output digits. Mathematically, the $i^{th}$ output digit O(i) can be described by $$O(i) = \sum_{k=1}^{N} s_k(i) \cdot t(k) \quad (2)$$

The digital signals on line 57, which represent the output digits O(i), are delivered to sync pulse, filtering and clipping circuit 60, which produces corresponding a digital output signal on line 61.

Circuit 60 performs a clipping function. Most of the output digits O(i) have values near to zero (mid-scale), as is apparent from FIG. 2. A few, rare output digits have values near to positive or negative full scale. Although rare, these values can create transmission difficulties in a high power transmitter amplitude modulating a carrier. However, it has been found that these rare values can be reduced or eliminated without substantial degradation of the transmission fidelity. Thus, the circuit 60 includes a clipping circuit which reduces the magnitude of output digits near to positive or negative full scale. An appropriate threshold is about one-half of full scale. This threshold can be varied; lower thresholds produce a higher error rate but reduce the peak-to-RMS ratio of the signal. A peak-to-RMS ratio of 6–9 dB has been found to produce an acceptably low error rate and to be capable of effective transmission by amplitude modulation.

Circuit 60 also performs digital filtering of the digital signal on line 57. A digital finite impulse response (FIR) filter within circuit 60 eliminates high-frequency components from the signal on line 57. As noted above, the signal must be filtered before transmission to ensure that the transmission does not expand beyond the allowable "mask". Digital filtering helps to ensure that this is accomplished. A suitable filter may have a cutoff frequency of approximately 1 divided by the length in time of the pulses 32 (FIG. 2) in the transmitted CSM signal.

In some embodiments, circuit 60 may also perform an anti-logarithmic (exponential) function on the output digits. An exponential may be computed by a lookup table inside of circuit 60. An exponential function may improve the fidelity of reception when a logarithmic amplifier is used in the receiver (as noted below). However, in the present implementation, no exponential function is used.

Finally, circuit 60 adds the synchronization signals 34, 36 (FIG. 2) to the digital signal on line 57. This is done by inserting positive and negative fixed level, for example ¼ scale digital samples between each sequence of output digits received on line 57.

The output of circuit 60 is a processed digital signal on line 61. A 12-bit D/A converter 62 converts this signal into an analog signal. A suitable D/A converter may be purchased from Analog Devices, 1 Technology Way, Norwood, Mass. 02062. The analog output of the D/A is low-pass filtered by a reconstruction filter 64 which eliminates the clock signal frequencies produced by the D/A converter. Reconstruction filter 64 has a bandwidth wider than the FIR filter in circuit 60, but has a cutoff frequency less than 1 divided by the time period between adjacent pulses 32 (FIG. 2) in the transmitted CSM signal.

In accordance with the above, to begin a sequence, circuit 60 generates two synchronization pulses. After a synchronization pulse is generated by circuit 60, timing and sequence generator 40 produces sequences on lines 45, which are combined with data triples via mapping circuits 48, 50, multipliers 52, and summers 56 to produce a series of sixty-three accumulated sums on line 57. Each accumulated sum is converted by D/A converter 62, to produce a pulse 32 of the encoded baseband CSM signal (FIG. 2).

The resulting signal on line 20 is characterized by a series of pulses 32 of varying amplitudes, each amplitude being derived from the value of an output digit O(i) in the output sequence on line 57.

The signal on line 20 has a pseudo-random variation and thus appears in the frequency domain as approximately "white" noise. Because the signal is composed of repeated sequences, it is not true white noise; however, because each of these sequences contain an equal number of pseudo-randomly distributed 1's and 0's, the resulting signal will be sufficiently diffused in time and frequency that it will not audibly interfere with reception of the standard FM program material transmitted by the station and, displays the resilience of spread spectrum transmission to narrowband interference.

The general illustration of FIG. 3A shows an encoder which computes output digits for line 57 in a parallel fashion. However, where sufficiently fast circuitry can be obtained, these computations can be performed serially, as shown below with reference to FIGS. 3B and 3C, which provides economization of required circuitry.

Figure 3B:
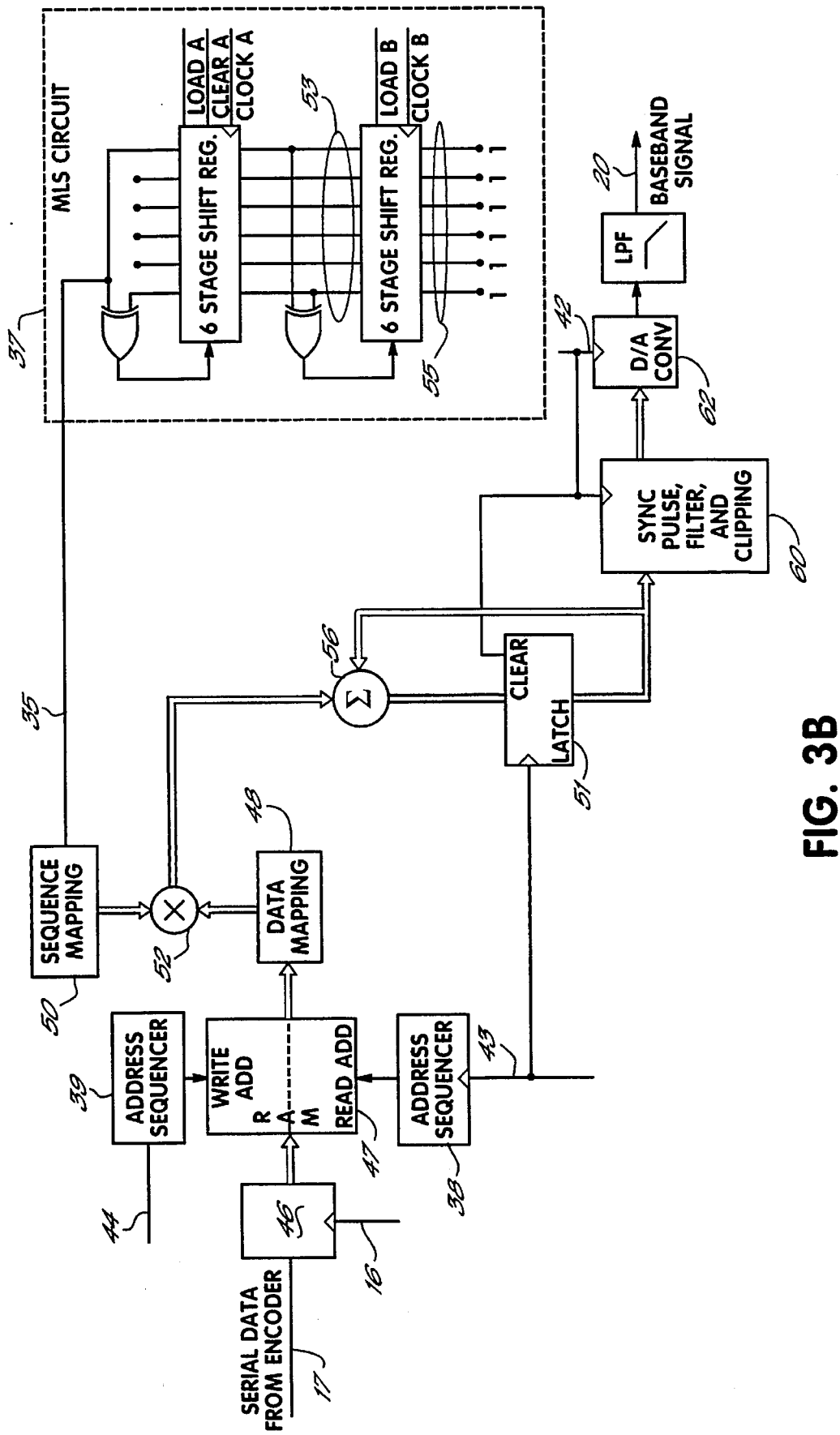
FIG. 3B is a block diagram of a specific implementation of a circuit for performing these functions.

In essence, the circuit of FIG. 3B computes each output digit by serially computing, in the time of one output data clock pulse on line 65, each of the individual sums which are computed in parallel in the circuit of FIG. 3A.

Thus, referring to FIG. 3B, a specific implementation includes only one data mapping circuit 48, sequence mapping circuit 50, and digital multiplier 52. These elements are used to serial compute the sums computed in parallel in the general illustration of FIG. 3A.

Serial data received from the encoder 14 (FIG. 1) on line 17 is coupled to a shift register 46. Shift register 46 clocks serial data using data clock 16. Shift register 46 produces a three-bit parallel output, which corresponds to a three-bit triple (Da, Db, Dc) such as discussed above with reference to FIG. 3A.

The parallel output of shift register 46 is coupled to a data input port of a random access memory (RAM) 47. The write address input of RAM 47 is coupled to an address sequencer 39. Address sequencer 39 responds to a clock signal on line 44 to produce serially-incrementing addresses to RAM. The address produced by sequencer 39 has one of 126 possible values; the output of sequencer 39 cycles through these 126 values in sequence, in response to the clock signal on line 44. The clock signal on line 44 has a frequency which is one-third of the frequency of data clock 16.

As a result of the foregoing, serial data received from the encoder on line 17 is converted to parallel three-bit triples (Da, Db, Dc), and these triples are stored in 126 sequential memory locations in RAM 47 under the control of sequencer 39.

Three-bit triples which are stored in RAM 47 are read from an data output port of RAM 47 connected to data mapping circuit 48. The read address input of RAM 47 is coupled to a second address sequencer 38. Address sequencer 38 responds to a clock signal on line 43 to produce serially-incrementing addresses to RAM. The address produced by sequencer 38 has one of the 128 possible values which can be produced by sequencer 39. (However, as discussed further below, at any given time, the output of sequencer 38 can only cycle through sixty-three of these possible values in sequence, in response to the clock signal on line 44.) The clock signal on line 43 has a frequency which is sixty-three times larger than the frequency of the clock signal on line 44.

As a result of the foregoing, triples (Da, Db, Dc) buffered in RAM 47 are read from RAM 47 and supplied to data mapping circuit 48 at a high frequency. These triples are then used to compute pulses 32 (FIG. 2) to be output on line 20. Specifically, sixty-three previously stored triples (Da, Db, Dc) are read from RAM 47 and output to data mapping circuit 48 to compute the value of one pulse 32. In the time taken to read these sixty-three previously-stored triples, one new triple is shifted into shift register 46 and stored in RAM 47.

To prevent conflicts between writing and reading of data in RAM, address sequencers 38 and 39 implement a memory-paging scheme. Specifically, during those periods when sequencer 39 is causing triples to be written into a first group, or page, of sixty-three storage locations in RAM 47, sequencer 38 will cause triples to be read sequentially from a second group, or page, of sixty-three storage locations in RAM 47. The use of paging is illustrated by a dotted line dividing RAM 47, indicating that the storage locations in RAM 47 are separated into two pages.

In one implementation of a paging scheme, synchronizers 38 and 39 are identical circuits. However, the inverse of the most significant bit of the output of sequencer 39 is used as a replacement for the most significant bit of the output of sequencer 38. Both synchronizers are simultaneously initialized to zero output values.

As is apparent from equation (2) above and the general description of FIG. 3A, each output digit O(i) is a sum of 63 products, the k-th product being generated from the k-th transmission digit t(k) and the i-th bit of the k-th sequence $s_k(i)$.

In the circuit of FIG. 3B, these output digits are generated in series, by combining previously stored transmission digits in RAM 47 with the appropriate bits of the sequences s. As discussed in further detail below, the appropriate bits of the sequences s are generated on line 35 by a maximal length sequence (MLS) circuit 37.

Transmission digits retrieved from RAM 47 are coupled to a data mapping circuit 48, where the digits are converted to a two's-complement, Grey-coded form as noted in the truth table set forth above. Sequence bits on line 35 are similarly coupled to a sequence mapping circuit 50 and converted to a two's-complement form as noted in the truth table set forth above. The outputs of mapping circuits 48 and 50 are multiplied in a two's-complement multiplier 52 to form one of the 63 products $s_k(i) \cdot t(k)$ needed to generate an output digit O(i) in accordance with equation (2) above.

The products generated by multiplier 52 are accumulated in an accumulator circuit including a latch 51 and digital adder 56. To begin computation of an output digit O(i), latch 51 is cleared to a zero value, for example by a clock signal on line 42, and at the same time circuit 60 produces a synchronization pulse. Thereafter, adder 56 adds the value in latch 51 to the product of a transmission digit and sequence digit produced by multiplier 52, and the result is stored in latch 51. This adding process continues as each product is generated by multiplier 52; latch 51 stores each new sum in response to, for example, the clocking signal on line 43 which drives address sequencer 38.

After 63 such multiplications and additions have been performed, the value of an output digit O(i) has been computed and appears at the output of latch 51 and the input of circuit 60.

As noted above with reference to FIG. 3A, as each output digit is computed, circuit 60 performs filtering and clipping functions on the output digit and presents it to D/A converter 62 for conversion to an analog signal. This analog signal is further filtered by filter 64 and presented on line 20 as the output baseband CSM signal.

Now turning to a more detailed description of MLS circuit 37, it is useful to note that, because the 63 sequences s are formed from 63 phased versions of a 63 bit maximal-length sequence, groups of corresponding bits from the sequences s are also 63 bit maximal-length sequences. Thus, the first bits of the 63 sequences s form a maximal length sequence. The second bits of the 63 sequences s form the same maximal length sequence, but barrel shifted one place from the sequence formed from the first bits of the 63 sequences s. The third bits of the 63 sequences s form this same maximal length sequence, barrel shifted two places. This relationship holds for any grouping of the first 63 bits of the 63 sequences s. (As noted above, the 64-th bits of the sequences s are all "0" values.)

Because of the above relationship, output digits O(i) can be serially calculated by computing 63 products of 63 previously-stored transmission digits t and respective bits of a 63 bit maximal length sequence. These products are accumulated to form the appropriate output digit O(i).

The above-referenced chapter "Coding for Communications and Ranging", shows that a maximal-length sequence can be produced by initializing a shift register with a selected generator code, and then repeatedly forming the exclusive-OR of two or more selected bits of the shift register, shifting the result into the beginning of the shift register. The bits shifted out of the end of the shift register will form the maximal length sequence. Thus, 63 bit maximal length sequences are generated inside of MLS circuit 37 by initializing 6-bit shift registers A and B with generator codes, then repeatedly shifting the exclusive-OR of the first and last bits in the shift registers into the beginning of the shift registers.

Input lines 55 of shift register B are connected to logic "1" values, so that shift register B can be preloaded with the binary generator code 111111. The output lines 53 of shift register B are connected to inputs of shift register A, so that the binary values stored at any given time in shift register B can be preloaded into shift register A.

This arrangement is used as discussed below to generate, at the output 35 of shift register A, differently phased versions of a 63-bit maximal-length sequence, by initializing shift register A with generator codes produced in shift register B.

For example, to generate the first phase of a maximal length sequence, shift register B is initialized with generator code 111111, and shift register A is initialized with the output of shift register B, so that shift register A also contains generator code 111111. After thus initialized, a 63 bit maximal-length sequence will produced by repeated shifting of shift register A, namely:

111111010101100110111

011010010011100010111

100101000110000100000

As noted above, this 63 bit maximal length sequence corresponds exactly to the first bits s(1) of the 63 sequences s. Thus, these 63 bits can be combined with the transmission digits t stored in RAM 47 to compute the first output digit O(1) in accordance with equation (2) above.

While this maximal-length sequence is being shifted out of shift register A, shift register B is shifted one time, so that shift register B contains the generator code 111110.

Next, shift register A is initialized with the generator code 111110 at the output of shift register B. After thus initialized, a differently-phased 63-bit maximal-length sequence will be produced by repeated shifting of shift register A, namely:

111110101011001101110

110100100111000101111

001010001100001000001

By inspection, it can be seen that the second sequence is the same as the first sequence, but barrel-shifted one digit to the right. Furthermore, as noted above, this 63 bit maximal length sequence corresponds exactly to the second bits s(2) of the 63 sequences s. Thus, these 63 bits can be combined with the transmission digits t stored in RAM 47 to compute the second output digit O(2) in accordance with equation (2) above.

While this second, differently-phased sequence is being shifted out of shift register A, shift register B is again shifted once, so that it contains the generator code 111101. This generator code is then loaded into shift register A, and then shift register A is repeatedly shifted to produce a third 63-bit maximal length sequence, which is barrel-shifted two bits to the right relative to the first sequence identified above. The bits of this third sequence can then be used to compute the third output digit O(3) in accordance with equation (2).

This process continues, eventually producing at output 35, 63 different phase-shifted versions of the 63 bit maximal-length sequence.

As noted above, the final, 64-th bits of the sequences s are all "0" values. Therefore, to compute the last output digit O(64), shift register A is cleared, so that the bits produced on line 35 during computation of the last output digit O(64) all have a "0" value.

Figure 3C:
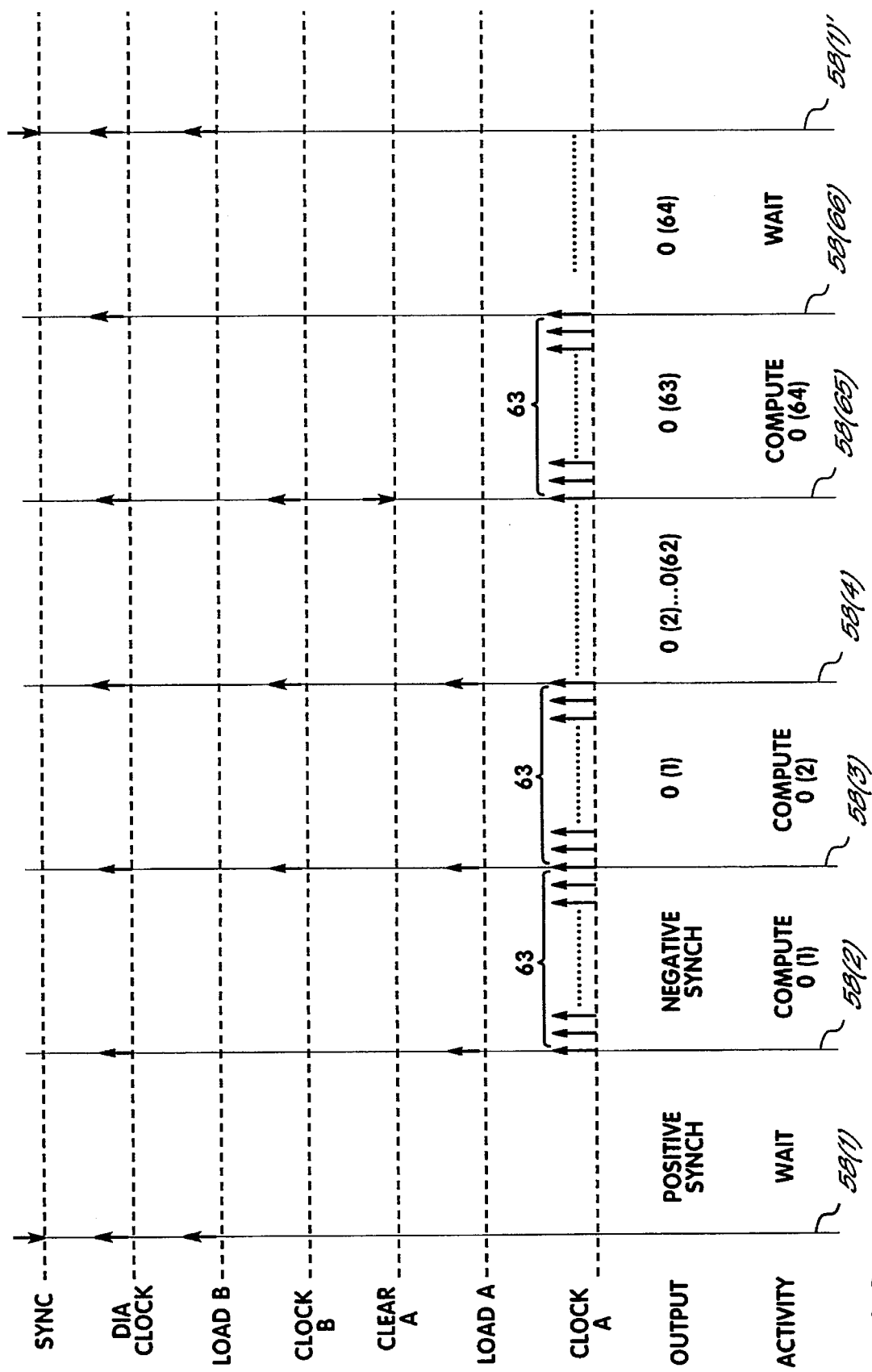
FIG. 3C is a timing diagram useful for understanding FIG. 3B.

The operation of MLS circuit 37 can be understood more specifically by reference to FIG. 3C. Referring to FIG. 3C, to begin generation of an output sequence 30 (FIG. 2), at time 58(1), prior to the transition of the synchronization signal SYNC, circuit 60 generates the positive portion of a synchronization pulse.

Then, at the time of the synchronization pulse 58(1), a transition of the LOAD B signal is applied to shift register B of MLS circuit 37, causing shift register B to initialize with the generator code 111111. Furthermore, a transition of the D/A clock signal on line 42 causes D/A converter 62 to produce an analog output corresponding to the positive synchronization pulse. This transition also causes circuit 60 to produce a digital output corresponding to a negative synchronization pulse.

Next, at time 58(2), transition of the D/A CLOCK signal on line 42 causes D/A converter 62 to produce an analog output value corresponding to the negative portion of the synchronization pulse. This transition also causes circuit 60 to begin generating an output derived from the output of latch 51. At the same time, a transition of the LOAD A signal is applied to shift register A of MLS circuit 37, causing shift register A to initialize with the generator code 111111 which appears at the outputs of shift register B. Furthermore, a transition of the CLOCK B signal is applied to shift register B of MLS circuit 37, causing the outputs of shift register B to advance to the state 111110.

During the period between time 58(2) and time 58(3), 63 transitions of the CLOCK A signal cause shift register A to produce, at its output 35, a 63 bit maximal-length sequence having the values of the first-described sequence above. During the same period, 63 synchronized transitions on line 43 cause address sequencer 38 to retrieve 63 different transmission digits from RAM 47; these same transitions cause latch 51 to accumulate the sum of products of transmission digits and sequence digits, as discussed above.

After these 63 transitions, the first output digit O(1) has been computed, and the value of this output digit appears at the output of latch 51, and a filtered, clipped version of the digit appears at the output of circuit 60. Thus, at time 58(3), a transition of the D/A CLOCK signal on line 42 causes the D/A converter to produce an analog output value corresponding to the first output digit. At the same time, a transition of the LOAD A signal is applied to shift register A of MLS circuit 37, causing shift register A to initialize with the generator code 111110 which appears at the outputs of shift register B. Furthermore, a transition of the CLOCK B signal is applied to shift register B of MLS circuit 37, causing the outputs of shift register B to advance to the state 111101.

During the period between time 58(3) and time 58(4), 63 transitions of the CLOCK A signal cause shift register A to produce, at its output 35, a 63 bit maximal-length sequence having the values of the second-described sequence above. During the same period, 63 synchronized transitions on line 43 cause address sequencer 38 to retrieve 63 different transmission digits from RAM 47; these same transitions cause latch 51 to accumulate the sum of products of transmission digits and sequence digits, as discussed above.

After these 63 transitions, the second output digit O(1) has been computed, and the value of this output digit appears at the output of latch 51, and a filtered, clipped version of the digit appears at the output of circuit 60. Thus, at time 58(4), a transition of the D/A CLOCK signal on line 42 causes the D/A converter to produce an analog output value corresponding to the second output digit. At the same time, a transition of the LOAD A signal is applied to shift register A of MLS circuit 37, causing shift register A to initialize with the generator code 111101 which appears at the outputs of shift register B. Furthermore, a transition of the CLOCK B signal is applied to shift register B of MLS circuit 37, causing the outputs of shift register B to advance to the state 111010.

This process repeats continuously until, after 63 repetitions, the circuitry of FIG. 3B arrives at time 58(65). At this time, the circuitry of FIG. 3B prepares to compute the value of the last output digit O(64). As noted above, the last bit of each sequence s is "0"; therefore, at time 58(65), unlike the preceding repetitions, there is no transition of the LOAD A signal, instead, a transition of the CLEAR A signal is applied to shift register A, causing shift register A to clear to a value of 000000.

During the period between time 58(65) and time 58(66), 63 transitions of the clock A signal, and corresponding synchronized transitions on line 43, cause transmission digits stored in RAM 47 to be combined with sequence digits produced on line 35 from circuit 37. However, the sequence digits produce on line 35 all have a "0" value, since these digits represent the final digits in the 63 sequences s.

Thus, at time 58(66), the final output digit O(64) appears at the output of circuit 60. At this time, a transition of the D/A CLOCK signal on line 42 causes D/A converter 62 to convert this final value to an analog level for output in the baseband CSM signal on line 20. At the same time, circuit 60 resets and begins producing a positive synchronization pulse at its output. The circuit of FIG. 3A is therefore ready to begin a new cycle, producing a new set of output digits O(i) beginning at time 58(1)'.

Figure 4:
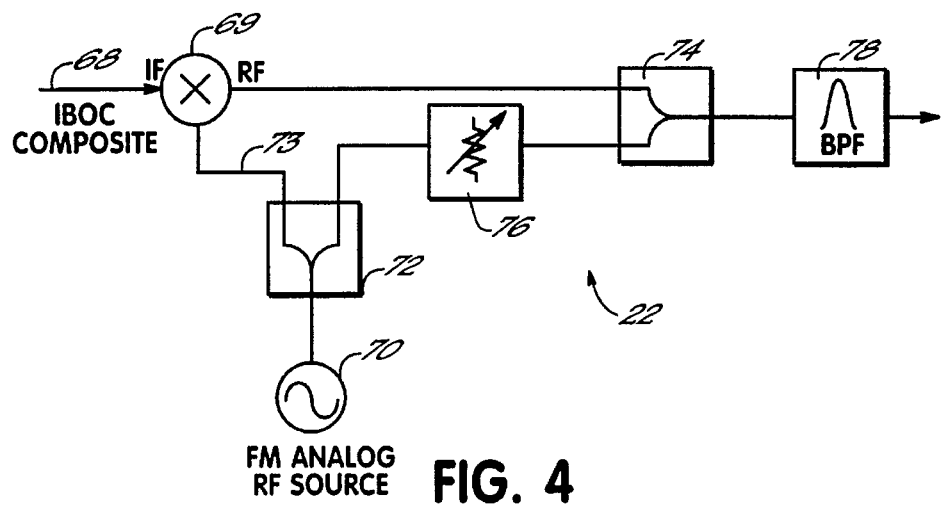
FIG. 4 is a block diagram of the upconverter 22 of FIG. 1.

Referring now to FIG. 4, RF upconverter 22 accepts the baseband CSM signal on line 68 and amplitude modulates it in analog modulator (multiplier) 69. The carrier used for the modulation is the (frequency modulated) RF FM signal, which originates from the radio station's conventional FM modulation equipment represented generally by AC source 70. The FM signal is split by balanced splitter 72 and fed on line 73 to the local oscillator input of modulator 69.

Modulator 69 produces at its output an amplitude modulated version of the frequency-modulated carrier on line 73. This amplitude modulated carrier is combined in balanced combiner 74 with an attenuated version of the carrier produced by attenuator 76 (the input of attenuator 76 is connected to the second output of splitter 72). The average amplitude of the carrier is adjusted to produce a moderate, e.g. 15%, modulation of the carrier by controlling the attenuation level of attenuator 76. The output of combiner 74 is fed to a band pass filter 78 which prepares the signal for transmission. Filter 78 is a wide band filter which eliminates spurs or images from mixer 69.

Figure 5:
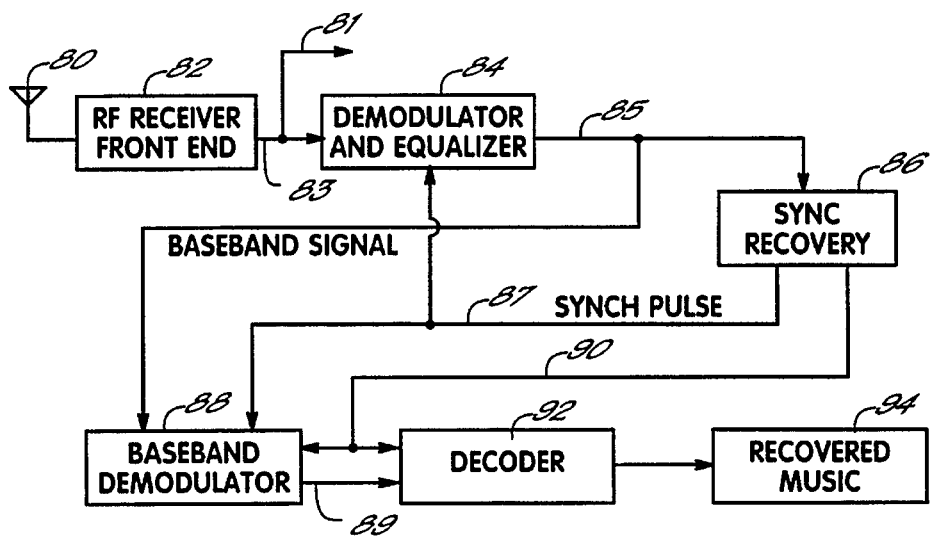
FIG. 5 is a block diagram of a receiver in accordance with principles of the present invention.

As shown in FIG. 5, a receiver for decoding the CSM/IBOC transmission includes a conventional RF front end superhetrodyne receiver 82 (see FIG. 6, below) which demodulates the signals received from the antenna 80 and produces an intermediate frequency (IF) output on lines 81 and 83. Line 81 leads to a conventional FM receiver (e.g., including a limiter, phase locked loop, etc.) which demodulates the conventional frequency-modulated program material.

Line 83 leads to an amplitude modulation (AM) demodulator and equalizer 84 in accordance with principles of the present invention (see FIGS. 7, 8A and 8B, below), which demodulates the amplitude modulated CSM signal from the IF signal and generates a baseband CSM signal on line 85 which (barring noise and distortion) represents the baseband CSM signal on line 20 in the transmitter.

This baseband CSM signal is fed to sync recovery circuit 86 (see FIG. 9, below) which extracts the synchronization signal 34, 36 (FIG. 2) and produces a synchronization pulse signal on line 87, which is fed to demodulator/equalizer 84 for use in offset equalization (see FIG. 7, below) and to demodulator 88 for use in decoding the baseband CSM signal (see FIG. 10, below).

Demodulator 88 (see FIG. 10, below) converts the baseband CSM signal on line 85 into a serial data stream on line 89 which, in synchronization with a clock signal on line 90, is serially loaded into decoder 92 which recovers the music or other program material 93 from the serial digital data in accordance with the encoding and/or digital signal processing used in encoder 14 (FIG. 2).

Figure 6:
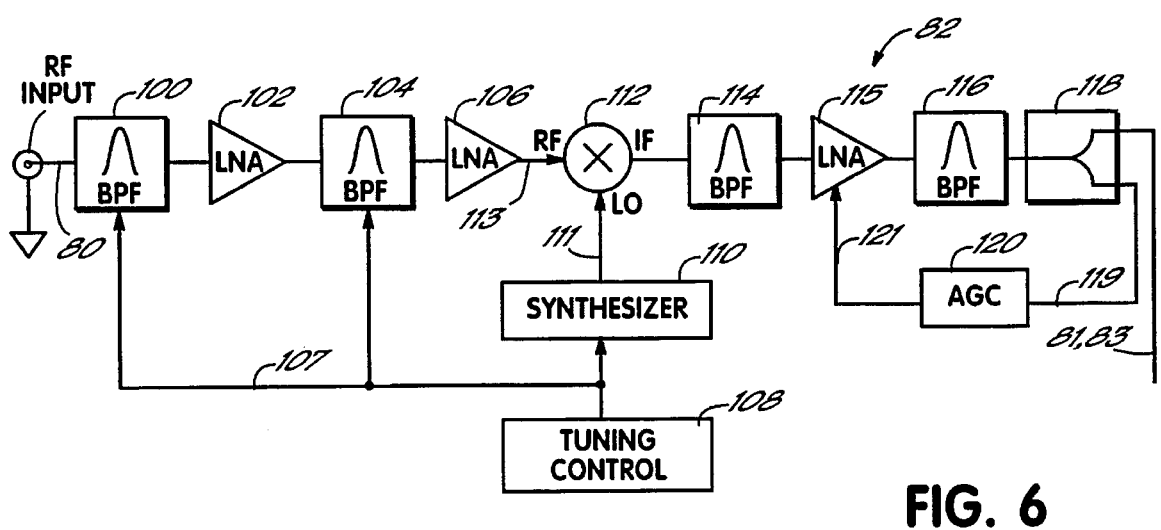
FIG. 6 is a block diagram of the receiver front end 82 of FIG. 5.

Referring to FIG. 6, the demodulator stage of circuit 84 has a superhetrodyne design. The RF input from the antenna on line 80 is filtered by two tunable RF bandpass filters 100, 104. The filtered signals are amplified by respective low noise amplifiers 102 and 106. The center frequencies of filters 100 and 104 are controlled by a user-adjustable tuning control 108, which places a tuning signal on line 107 leading to the band pass filters.

The tuning signal on line 107 also controls synthesizer 110, which produces a tuned sinusoidal output on line 111. This sinusoidal output is fed to the local oscillator input of RF demodulator 112, which multiplies the filtered RF signal from amplifier 106 on line 113 by the sinusoidal signal on line 111 to shift the RF signal on line 113 to a 10.7 MHz center frequency. This 10.7 MHz center frequency signal is band pass filtered by a fixed IF bandpass filter 114. The result is fed to an automatic gain control (AGC) stage which normalizes the amplitude of the IF signal.

Within the AGC stage, the IF signal is fed through a low noise IF amplifier 115 and a second band pass filter 116. The signal is then split by balanced splitter 118. One output 81, 83 of splitter 118 leads to the FM and CSM demodulators, and the second output 119 leads to AGC circuit 112. AGC circuit 112 senses the amplitude of the signal on line 119 and produces a gain control signal on line 121 which feeds back to amplifier 115 to control the gain of amplifier 115.

Thus, through operation of the AGC circuit 112, the magnitude of the IF signal on line 118 is held within desired limits. Note, however, that this AGC circuit operates at a relatively low bandwidth; it will compensate for relatively slow signal magnitude changes, such as those which gradually occur as the receiver moves closer to or further away from the transmitter. The AGC circuit must have a low bandwidth so that it will not react to or distort the amplitude modulation of the carrier. However, this means that the AGC circuit will also not react to multipath "barking", which may occur as the receiver moves into and out of multipath reception areas. Thus, other circuitry, discussed below, is needed to deal with multipath.

Suitable bandpass filters 100, 104 can be purchased from Pole-Zero corporation, 5530 Union Centre Drive, West Chester, Ohio 45069. The remaining components are standard FM receiver front end components and are available from many sources of analog circuit components, for example Analog Devices, Minicircuits, and Cougar.

As noted above, the AM demodulator stage includes an automatic gain control stage, but this stage cannot compensate for high-frequency "barking" of the signal due to multipath reception. These rapid magnitude changes are handled by amplitude equalization circuitry, described below.

Figure 7:
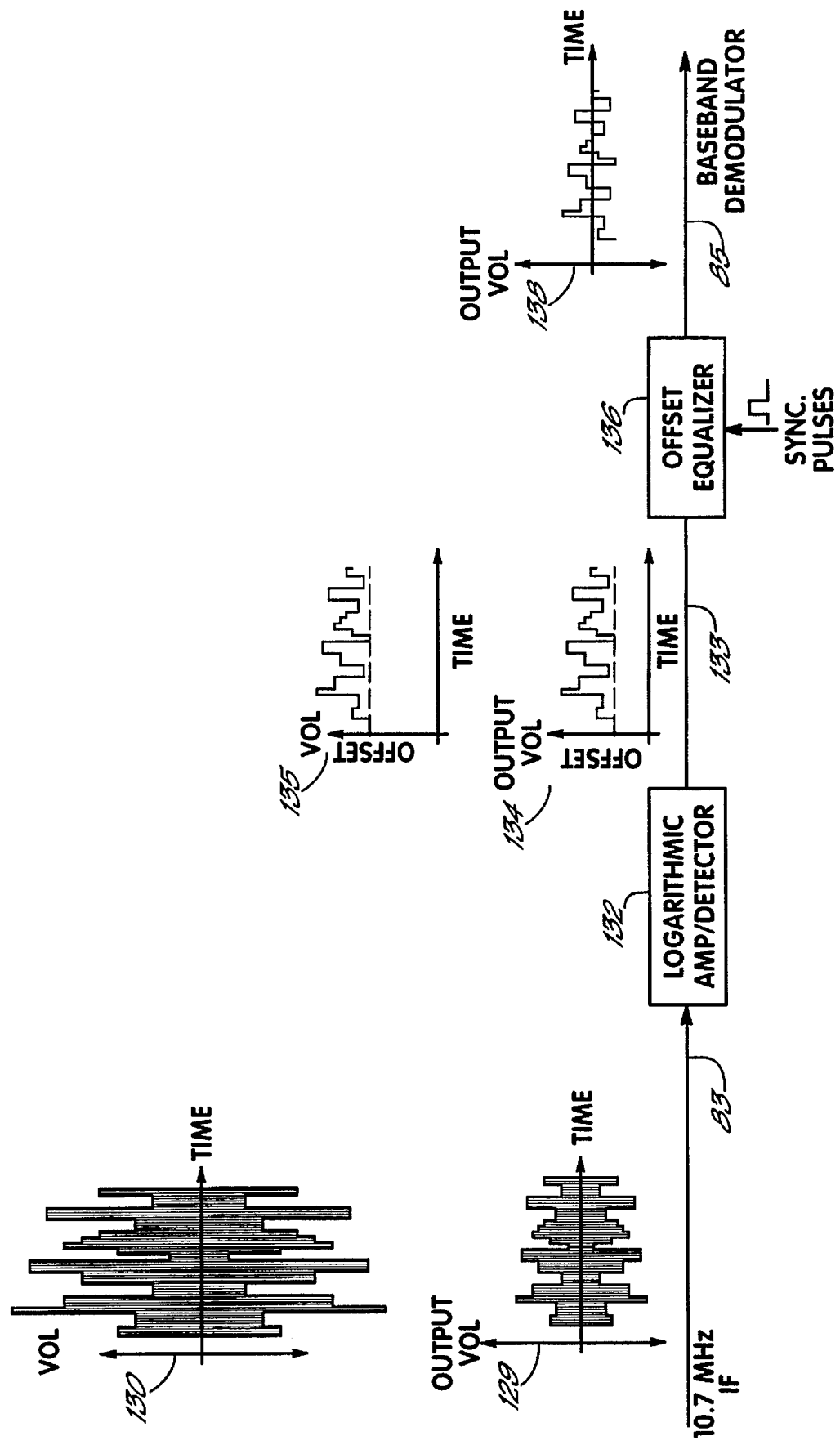
FIG. 7 is a block diagram with waveform illustrations of the demodulator and equalizer 84 of FIG. 5.

Referring to FIG. 7, as shown in plots 129 and 130, multipath can cause rapid gain changes in the signal on line 83; plot 129 shows a typical baseband CSM signal and plot 130 shows the same signal with a gain three times larger.

To compensate for these gain changes, the IF signal on line 83 feeds into a logarithmic amplifier/detector 132. Amplifier/detector 132 (see FIG. 8) converts the amplitude modulated signal on line 128 to a signal on line 133 having a DC magnitude proportional to the average amplitude of the IF input on line 128 and an AC component representing the envelope of the signal on line 130. Plots 134 and 135 show the signals produced on line 133 in response to the signals of plots 129 and 130, respectively. Note that the gain of the signals has been normalized: the AC components in plots 134 and 135 are identical; only the DC magnitudes differ. The different gains of the original signals, as shown in plots 129 and 130, have been converted into DC offsets, without affecting the AC components.

The signal on line 133 is fed to offset equalizer 136, which removes the DC component, producing an AC-only signal on line 137. Because the signals in plots 134 and 135 have the same AC components, once the DC components are removed, both signals result in the same AC-only signal, shown in plot 138.

Figure 8A:
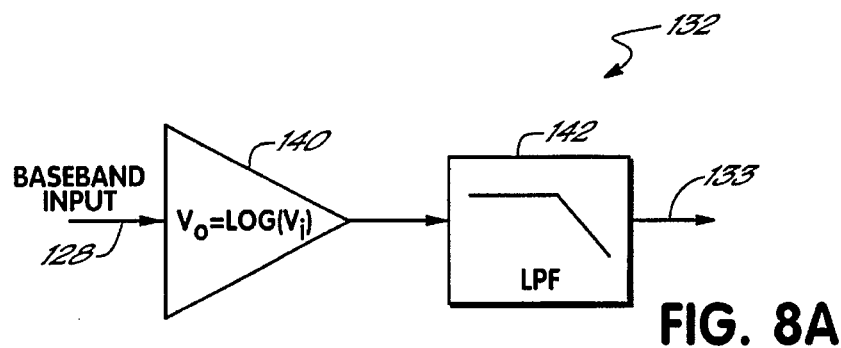
FIG. 8A is a block diagram of the logarithmic amplifier/detector 132 of FIG. 7.
Figure 8B:
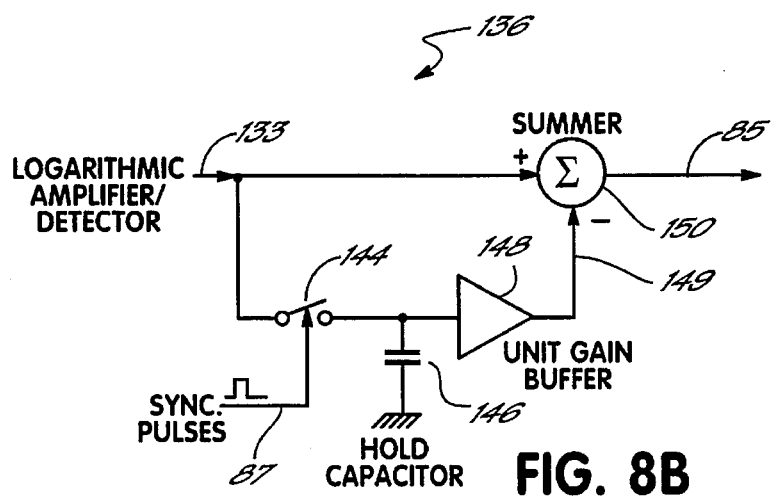
FIG. 8B is a block diagram of the offset equalizer 136 of FIG. 7.

As shown in FIG. 8A, the logarithmic amplifier/detector circuit 132 comprises a logarithmic amplifier/detector 140, the output of which is filtered by a single-pole low pass filter 142 to produce an output on line 133. A suitable circuit for performing these functions is available from Analog Devices as part no. AD640.

The operation of the circuit of FIG. 8A can be best understood by considering the mathematical function performed by logarithmic amplifier 140. The IF input signal $V_{in}$ on line 128 can be described by the following equation:

$$V_{in}=\kappa(t)A(t)\cos(\omega t+\phi(t)) \quad (3)$$

where $A(t)$ is the amplitude envelope which contains the IBOC AM modulated signal, $\kappa(t)$ is a gain coefficient which represents high-frequency signal gain changes, such as those caused by multipath reception (lower frequency gain changes are removed by the AGC stage in the receiver), $\omega$ is the angular frequency of the carrier, and $\phi(t)$ is a phase-modulation component representing the standard FM broadcast on the carrier.

The output of logarithmic amplifier 140 is the log of the expression given in equation (3), i.e., $$\log(V_{in})=\log[\kappa(t)A(t)\cos(\omega t+\phi(t))]. \quad (4)$$

However, equation (4) can be simplified using the property of logarithms that the logarithm of a product of two terms equals the sum of the individual logarithms of the terms. Therefore:

$$\log(V_{in})=\log[\kappa(t)]+\log[A(t)]+\log[\cos(\omega t+\phi(t))]. \quad (5)$$

Thus, the output of the logarithmic amplifier 140 is a equal to the sum of three separate time-varying terms, namely, the log of the multipath gain $\kappa$, the log of the envelope $A$, and the log of the carrier $\cos(wt)$.

It is now necessary to consider the frequency content of the three time-varying terms in equation (5). The carrier $\cos(\omega t)$ is a high frequency term, approximately 10.7 MHz. The amplitude variation $A(t)$ is a relatively moderate frequency term; as shown in plot 130 (FIG. 7) the amplitude of the carrier varies much more slowly than the carrier frequency. The multipath gain $\kappa$ has the lowest frequency variation of the three terms; in most cases it will remain relatively constant throughout a transmitted output sequence 30 (FIG. 2).

Low pass filter 142 is configured to pass frequencies below the 10.7 MHz frequency of the carrier $\cos(\omega t)$, but reject the carrier frequency and any higher frequencies; as a result, the output signal on line 133 includes only the first two terms in equation (5), i.e., the output $V_{out}$ on line 133 equals:

$$V_{out}=\log[\kappa(t)]+\log[A(t)]. \quad (6)$$

As shown in plots 134 and 135 (FIG. 7), the output signal has a DC component which reflects the multipath gain $\kappa$, and an AC component which reflects the amplitude modulation A(t).

As shown in FIG. 7, the offset voltage is removed by offset equalizer 136. Referring FIG. 8B, offset equalizer 136 does this by regularly sampling the signal on line 133 by closing sampling switch 144, causing capacitor 146 to charge to the DC voltage on line 133. Unity gain buffer 148 drives line 149 to the same voltage, and summer 150 subtracts this DC voltage from the signal on line 133, producing an AC-only signal on line 85.

For this offset equalizer circuit to operate properly, sampling switch 144 must be closed at a time when the IF input signal has a known relative amplitude. One appropriate time to do this is during the synchronization pulses 34, 36 (FIG. 2). Therefore, the synchronization pulse signal on line 87 (which is recovered by circuit 86—FIGS. 5 and 9) is used to toggle sampling switch 144. Thus, between each received sequence 30, the hold capacitor 146 is reset during the synchronization pulse, providing an effective measurement of the current DC level (multipath gain) in the signal on line 133.

Figure 9:
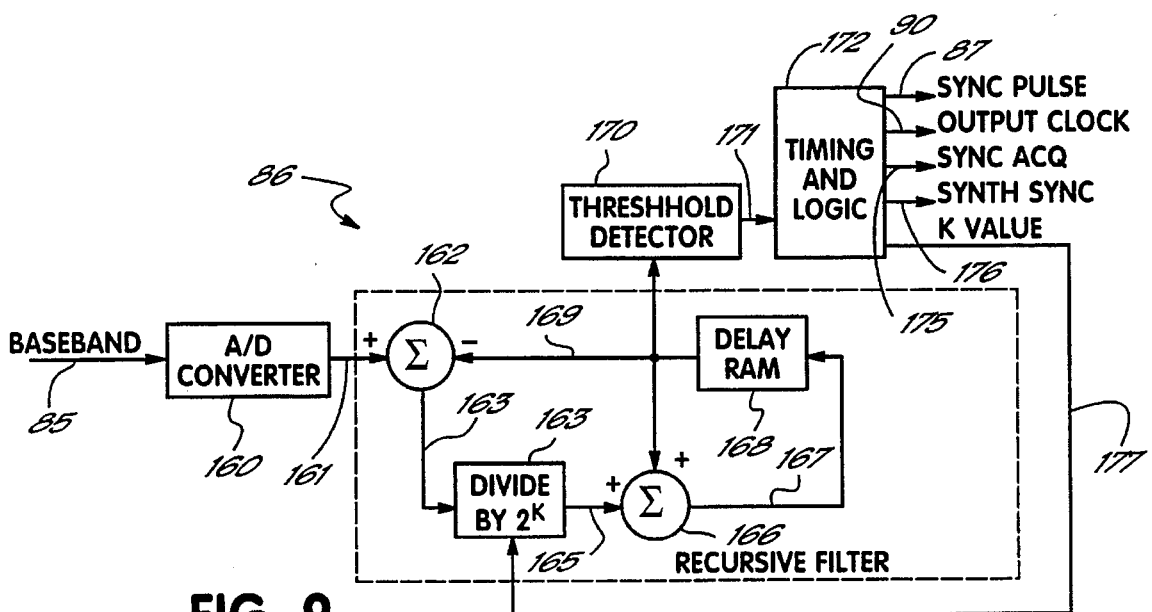
FIG. 9 is a block diagram of the sync recovery circuit 86 of FIG. 5.

As noted above, the synchronization pulse is recovered from the baseband CSM signal by circuit 86 (FIG. 5). Referring to FIG. 9, in essence, this circuit comprises a very narrow-bandwidth recursive digital filter.

In the circuit of FIG. 9, the baseband CSM signal on line 85 is first converted to an equivalent digital signal on line 161 by an analog to digital converter 160. Internal digital clocks cause A/D converter to perform conversions of the analog signal on line 85, and trigger the other digital elements in circuit 86. To provide accurate time resolution for determining synchronization pulse position, the data on line 161 is sampled at a high rate, for example about 2 MHz in the described circuit. The output of summer 162 on line 163 is shifted K places by shifter 164 (which effectively divides the digital value on line 163 by $2^K$). The result on line 165 connects to a non-inverting input of a second digital summer 166. The output of summer 166 on line 167 is stored in a random access memory (RAM) 168 which serves as an digital delay element; that is, when triggered by the internal digital clock, RAM 168 stores the input value on line 167, retrieves a value stored a time $\tau$ earlier, and produces the previously-stored value on line 169. (To achieve this, $\tau$ must be an even multiple of T, and RAM 168 must store $\tau/T$ previous samples.) This previously-stored value on line 167 serves as the output of the recursive filter, and is also connected to the inverted inputs of digital summers 162 and 166, creating recursive feedback in the filter.

It can be shown that the transfer function of the recursive filter, from the input $V_{in}$ on line 85 to the output $V_{out}$ on line 169 (converting the digital value on line 169 to an equivalent analog value), is $$\frac{V_{in}(s)}{V_{out}(s)} = \frac{e^{-s\tau}}{2^K} \cdot \frac{1}{1 + e^{-s\tau}(2^{-K} - 1)} \quad (7)$$

where $s=j\omega$. By plotting the magnitude and phase of this transfer function, it can be verified that this transfer function has sharp peaks at center frequencies $f=n/\tau$ where $n=1,2,3,\ldots$, and attenuates all other frequencies, and further that this transfer function has fixed delay at these center frequencies.

The baseband CSM waveform illustrated in FIG. 2 has concentrated spectral energy at the frequency of the synchronization pulse and its harmonics and randomly distributed spectral energy at other frequencies. Thus, by selecting $\tau$ to be equal to the time period between synchronization pulses, the recursive filter of FIG. 9 will produce at its output on line 169 a digital waveform primarily of the same relative amplitude and phase as the synchronization pulses in the baseband CSM waveform on line 85. This digital waveform is converted to a digital synchronization signal by a digital threshold detector 170, which identifies the peaks of the sinusoidal waveform and produces in response a digital signal on line 171 which is in phase with the synchronization pulses in the baseband CSM waveform on line 85.

The synchronization signal on line 171 feeds to a timing and logic circuit 172. Timing and logic circuit 172 includes a crystal clock running at a frequency substantially larger than that of the pulses in the baseband CSM signal, for example 48 MHz, which frequency is suitably divided to form output clock signals from circuit 172. Each time a synchronization pulse is detected by detector 170 and replicated on line 171, circuit 172 re-synchronizes this crystal clock to the received pulse on line 171. The pulses produced by the crystal clock are produced on line 90 for use by demodulator 88 (see FIG. 10, below); furthermore, synchronization pulses derived from the crystal clock are produced on line 87.

When circuit 172 has received a predetermined number of pulses on line 171 spaced N+1 samples apart, circuit 172 sets the synchronization acquired signal on line 175 to a true value. Thereafter, the signal on line 175 will remain true until circuit 172 fails to receive a second number of pulses on line 171 spaced N+1 samples apart, at which time circuit 172 will set the signal on line 175 to a false value. Thus, the signal on line 175 provides a measure of whether synchronization has been recently acquired from the received signal, and thus is a measure of the quality of the data being received.

When a synchronization pulse is received by circuit 172 and used to re-synchronize the internal clock in circuit 172, the synchronization synthesized signal on line 176 is set to a false value. However, if a synchronization pulse is not received N+1 samples later, circuit 172 sets the signal on line 176 to a true value. Thus, the signal on line 176 indicates whether circuit 172 is "synthesizing" the synchronization pulses on line 87 and output clock on line 90, i.e., is producing these pulses based upon the internal clock because synchronization pulses are not being received. Thus the signal on line 176 is a further measure of the quality of the data being received by the receiver.

The signals on lines 175 and 176 can be used, for example, by the decoder 92 (FIG. 5) in determining the signal quality while decoding the data produced by demodulator 88.

Circuit 172 also produces, on line 177, the value K, which is the number of bits of shift performed by shifter 164 to divide the output of digital summer 162. The value of K can be manually adjusted to change the bandwidth of the recursive digital filter, so that the integrity of the output signal on line 169 is optimized to consistently trigger a detection by threshold detector 170. It has been found that a K value of between three and ten provides satisfactory performance.

Low values of K produce a wideband filter which will capture the synchronization pulses rapidly but will be subject to noise, whereas high values of K will produce a narrowband filter which, although taking longer to capture the synchronization pulses, will be more noise immune.

It is possible to automatically adjust the value of K. To do this, circuit 172 would start with an arbitrarily low K value until a valid synchronization was achieved. The K value on line 177 would then be increased (decreasing the bandwidth of the recursive filter) to obtain a high signal to noise ratio. Whenever synchronization was lost, circuit 172 would return to lower K values to recapture synchronization.

The synchronization pulse on line 87 and clock signal on line 90 are used in the demodulator 88 to reconstruct the transmission digits from the baseband CSM signal on line 85.

Referring to FIG. 10A, in general, the transmission digits t are reconstructed by correlating the received baseband CSM signal on line 85 with each of the 63 sequences s. The demodulator 88 generates the 63 sequences s, and then correlate the sequences with the incoming baseband CSM signal by forming a sequence of products of each sequence with the baseband CSM signal, and then accumulating these products over the duration of an entire transmission sequence 30 (FIG. 2).

Accordingly, as generally represented in FIG. 10A, the demodulator must include a timing and sequence generation circuit 178 which generates the 63 64-bit sequences $s_1$, $s_2$, . . . $s_{63}$ on its output lines. The function of this circuit is similar to the generator 40 shown in FIG. 3A.

The correlation operation may be performed in an analog or digital manner; to perform digital correlation, an analog to digital (A/D) converter 179 converts the baseband CSM signal on line 85 to a digital signal, which is connected to 63 digital multipliers 180(1), 180(2), . . . 180(63). A/D converter 179 is sychronized to pulses of the CSM signal and averages four samples per pulse. A/D converter 179 may be a 10 or 12 bit converter; suitable converters are available from Analog Devices.

Each multiplier 180 receives at its second input a digital signal produced by a respective sequence mapping circuit 182(1), 182(2), . . . 182(63), each of which is connected to a respective sequence output of circuit 178. The sequence mapping circuits 182 create two's complement digital signals in accordance with the truth table discussed above with reference to mapping circuits 50 of FIGS. 3A and 3B.

The outputs of the multipliers 180 are fed to respective accumulator circuits 184(1), 184(2), . . . 184(63). These accumulators accumulate the products produced by multipliers 180 over the time period between synchronization pulses. A suitable digital accumulator can be formed from a latch and a summer, such as latch 51 and summer 56 as they are connected in FIG. 3B.

After accumulating over the time period between synchronization pulses, the value $v_i$ stored in the $i^{th}$ accumulator is proportional to a sum:

$$v_i \propto \sum_{j=1}^{n} s_i(j)O(j) \quad (8)$$

where the constant of proportionality is a function of the gain of the A/D converter 179. Substituting from equation (2) for O(j), this becomes $$v_i \propto \sum_{j=1}^{n} s_i(j) \cdot \sum_{k=1}^{n} s_k(j) \cdot t(k) \quad (9)$$

rearranging terms, this can be written as $$v_i \propto \sum_{k=1}^{n} \left[ \sum_{j=1}^{n} s_i(j) \cdot s_k(j) \right] \cdot t(k) \quad (10)$$

However, as illustrated by equation (1), the expression in braces in equation (10) will be equal to 0 whenever $i \neq k$, whereas when $i=k$, the sum in braces will be equal to 64. Thus, equation (10) can be substantially simplified by ignoring all terms of the sum where $i \neq k$, resulting in the substantially simpler expression $$V_i \propto 64 \cdot t(i). \quad (11)$$

Thus, the values remaining in the 63 accumulators 184(i) are directly proportional to the transmission digits t(i), indicating that the above circuit fully recovers the transmission digits.

The three most significant bits (MSBs) of the accumulators 184 indicate the extracted value of the transmission digits; thus, as shown in FIG. 10A, the most significant bits 189 of the accumulators 184 are input into respective data mapping circuits 190 to extract the transmission digits. Each data mapping circuit implements the truth table:

| A/D MSBs | (Dxa, Dxb, Dxc) |
|---|---|
| 000 | (0, 0, 1) |
| 001 | (0, 0, 0) |
| 010 | (0, 1, 0) |
| 011 | (0, 1, 1) |
| 100 | (1, 1, 1) |
| 101 | (1, 1, 0) |
| 110 | (1, 0, 0) |
| 111 | (1, 0, 1) |

This translation table converts Grey-coded data into straight binary encoding for output. Note that the Grey-coding minimizes error; if the MSBs of an accumulator output are off by one code, one and only one bit of the resulting triplet will be incorrect. This is a significant improvement over a non-Grey-coded scheme. If Grey coding were not used, an error which caused the MSBs of the A/D converter output to change from 011 to 100, or vice-versa, would create three bit errors in the resulting triplet; however, as seen from the above table, through the use of Grey coding the same error will produce only one incorrect bit.

The less significant bits of the accumulator output can be used to indicate the "certainty" of the more significant bits. These may be used in a "soft decision" error correcting scheme, for example Viterbi decoding, in decoder 92, allowing lower error rate recovery in noisy environments.

The data bits Dxa, Dxb and Dxc, and the less significant bits Vx-0 and Vx-1, are fed to three 189-bit shift registers 192, 193, 194. These shift registers are loaded by the synchronization pulse signal on line 87, and thereafter the bits in the shift registers are serially unloaded into serial communication lines 195, 196 and 197, respectively. Shift register 192, which contains the extracted data bits, is unloaded into serial line 195 at the frequency of a clock on line 198. (This clock is derived from the synchronization signal, and has 189 clock pulses between each synchronization signal.) Shift registers 193 and 194, which contain the least significant bits of the A/D output, are unloaded in parallel at a clock having one-third of the frequency of the clock in line 198.

The general illustration of FIG. 10A uses parallel circuitry to extract transmission digits from the baseband CSM signal. However, in a specific implementation this operation may be effectively performed in series.

In a serial implementation, the sum identified by equation (8) is computed directly from stored output digits O and serially-generated bits of sequences s. As above, the baseband CSM signal on line 85 is digitized by A/D converter 179, to form digitized representations of output digits O. However, this representations are not immediately used, but rather are stored in a RAM 199 for later, serial retrieval.

RAM 199 buffers output digits O in the same manner as RAM 47 (FIG. 3B) buffers transmission digits t. Newly-converted data is stored in a first page of RAM 199, in write address locations identified by an address sequencer 39'. At the same time, previously-stored output digits are retrieved from RAM 199 at read address locations identified by an address sequencer 38'.

Address sequencers 38' and 39' interact to write and read data in RAM 199 in the same manner as the corresponding elements 38, 39 discussed above with reference to FIG. 3B. Address sequencer 39' is clocked by the clock signal on line 90, so that RAM 199 stores digitized versions of each pulse 32 (FIG. 2) of the incoming baseband CSM signal on line 88. Address sequencer 38' is clocked at a frequency 63 times larger than the clock signal on line 90, as discussed further below. Thus, for each pulse in the received baseband CSM signal on line 88, one location in one page of RAM 199 is written, and 63 locations in the other page of RAM 199 are read.

The previously-stored output digits O read from RAM 199 are supplied to a digital multiplier 180, where they are multiplied by corresponding bits of one sequence s, so to form the products identified by equation (8) above.

The appropriate bits of the sequences s are generated by a MLS circuit 37' which is identical in structure and operation to MLS circuit 37 discussed above with reference to FIG. 3B, and is clocked in the manner discussed above with reference to FIG. 3C. As noted above, MLS circuit 37' generates at its output line 35', bits of each sequence s in synchrony with transitions of a CLOCK A signal applied to shift register A of the MLS circuit.

The clock signal on line 200 applied to address sequencer 38' includes transitions synchronized to the transitions of the CLOCK A signal, so that output digits O are produced from RAM 199 in synchronization with sequence digits s produced from MLS circuit 37'.

Multiplier 180 multiplies serially-produced output digits O from RAM 199 with serially-produced sequence digits s from MLS circuit 37', to produce a sequence of product signals. Each of these product signals corresponds to one product O·s of equation (8). These product signals are applied to an accumulator 184, where they are accumulated to form a sum as set forth in equation (8).

Accumulator 184 adds 64 of these product signals, in response to the clock signals on lines 90 and 200, and produces an accumulated output. As noted above, the three most significant bits (MSBs) of the accumulator output indicate the extracted value of the transmission digits, and these most significant bits 189 of the accumulators 184 are input into a data mapping circuit 190 to extract the transmission digits Da, Db and Dc. The less significant bits of the accumulator output can be used to indicate the "certainty" of the more significant bits, and are also output for "soft decision" error correction.

The serially-produced transmission digit triplets (Da, Db, Dc) and error correcting bits $V_0$, $V_1$, can then be directly serially shifted out on one or more lines 89 (FIG. 5) in any desired format.

In a parallel output implementation, transmission digit triplets (Da, Db, Dc) and error correcting bits $V_0$, $V_1$ can be buffered by a latch circuit 201. Latch circuit 201 stores these values as they are serially produced, and generates parallel output values which can be latched into shift registers 192, 193, 194 (FIG. 10A). Address sequencer 203 controls storage of data in circuit 201. Thus, when the first set of transmission digit triplets (D1a, D1b, D1c) and error correcting bits V1-0 and V1-1 have been computed, address sequencer 203 causes these values to be stored in latches 202-1, 204-1 and 206-1, respectively. Similarly, when the second set of transmission digit triplets (D2a, D2b, D2c) and error correcting bits V2-0 and V2-1 have been computed, address sequencer 203 causes these values to be stored in latches 202-2, 204-2 and 206-2, respectively. This process continues until all latches 202, 204 and 206 have stored computed values for transmission digits and error correcting bits. Then, in response to a synchronization pulse, this data is latched into shift registers 192, 193 and 194 (FIG. 10A), and circuit 201 begins storing new data in latches 202, 204 and 206.

As shown in the foregoing, in accordance with principles of the invention a CSM system may simultaneously transmit multiple transmission digits using code sequences developed from phases of a maximal length sequence, and recover the transmission digits in a robust manner.

While these principles have been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

Figure 10B:
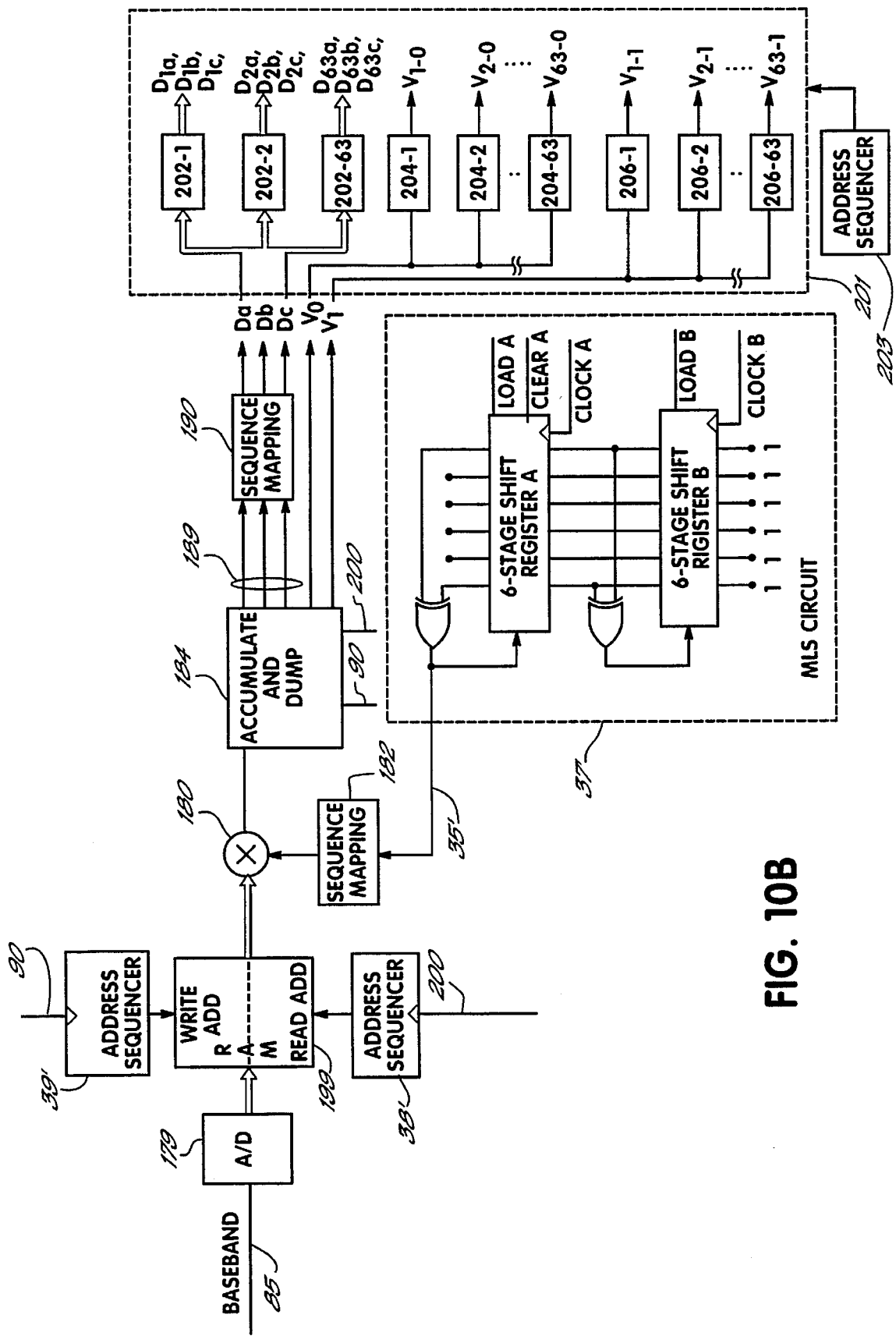
FIG. 10B is a block diagram of a specific implementation of a circuit for performing these functions.

For example, the encoders shown in FIGS. 3A and 3B, and the decoders shown in FIGS. 10A and 10B transmit digital data in groups of three bits encoded as one of eight evenly spaced analog levels. However, more digital signals could be transmitted by using more analog levels, albeit with greater error rates. Furthermore, fewer digital signals could be transmitted by reducing the number of analog levels, achieving lower error rates. Also, the analog levels need not be evenly spaced; for example, where the transmission channel has variable gain, logarithmically spaced analog levels may be more effective than evenly spaced analog levels. However, where the transmission channel is primarily plagued with noise or offsets, evenly spaced analog levels have been found most effective.

It should also be noted that analog signals can be transmitted in an analogous manner to digital signals, by multiplying each analog signal by a sequences s and summing the results to produce a transmission. In this manner, a multiplicity of different analog signals may be multiplexed onto a common carrier using the approaches described.

Also, in the implementation shown above, transmitted data is reconstructed by converting the baseband CSM signal into digital format first, and then performing digital multiplication and accumulation. However, these operations could also be performed in analog form, using analog multipliers and integrators in place of digital multipliers and accumulators.

Furthermore, to further improve the immunity of the system to multipath reception, a sounding pulse, uncorrelated to the CSM signal shown in FIG. 2, may be added to the transmission for use in adaptive filtering at the receiver. An equalizer at the receiver may determine the impulse response of the transmitter-receiver channel by detecting the characteristics of the sounding pulse when it is received. This information may then be used to adaptively develop filter coefficients to minimize the effects of multipath reception.

Synchronization need not be obtained from a synchronization pulse. Synchronization may also be obtained by transmitting one or more of the possible CSM sequences with a constant information signal level, and correlating to this sequence to synchronize the receiver.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of spread-spectrum encoding at least first and second information signals, the method comprising:
    generating a first code sequence comprising digital signals arranged in respective positions and having values with near-zero out-of-phase autocorrelation;

generating a second code sequence comprising the same number of digital signals as there are in said first code sequence, arranged in respective positions, the values of the digital signals having a phase shifted relation to said digital signals of said first code sequence, said code sequences further comprising an extra predetermined digital signal to each of said code sequences in the same predetermined position within each of said code sequences such that said sequences, when compared in-phase to each other, have exactly zero cross-correlation, and producing an output code sequence having a plurality of output levels corresponding to the number of digital signals in either of said code sequences, said output levels being formed from sums of products by repeating, for corresponding selected positions in the first and second code sequences, the steps of forming a first product by multiplying said first information signal with a digital signal in the selected position of the first code sequence, forming a second product by multiplying said second information signal with a digital signal in the selected position of the second code sequence, and summing the first and second products to produce an output level.

2. The method of claim 1 wherein said digital signals of said first and second code sequences comprise a maximal length code sequence.

3. The method of claim 2 wherein said digital signals have "1" or "0" values, and said extra predetermined digital signal has a "0" value, whereby exactly half of the digital signals in each code sequence have "1" values, the remainder having "0" values.

4. The method of claim 1 wherein said digital signals of said code sequences have magnitude values selected from a positive and a negative value.

5. The method of claim 1 wherein said information signals are analog signals.

6. The method of claim 1 wherein said information signals are encoded digital signals.

7. The method of claim 5 wherein said digital signals are encoded into an information signal as one of a plurality of possible analog signal levels.

8. The method of claim 7 wherein said possible analog signal levels are evenly spaced.

9. The method of claim 8 wherein three digital signals are encoded into each information signals as one of eight possible analog signal levels corresponding to the values +7, +5, +3, +1, −1, −3, −5 and −7.

10. The method of claim 7 wherein said possible analog signal levels are logarithmically spaced.

11. The method of claim 1 wherein producing said output code sequence further comprises adding a synchronization pulse to said plurality of output levels.

12. The method of claim 11 wherein said synchronization pulse is added prior to a first output level of said output code sequence.

13. The method of claim 1 applied to encoding at least a third information signal for transmission, further comprising:

generating a third code sequence comprising digital signals arranged in respective positions, the values of the digital signals having a phase shifted relation to said digital signals of said first and second code sequences, wherein said output levels of said output code sequence are formed from sums of products by repeating, for corresponding selected positions in the first, second and third code sequences, the steps of forming a first product by multiplying said first information signal with a digital signal in the selected position of the first code sequence, forming a second product by multiplying said second information signal with a digital signal in the selected position of the second code sequence, forming a third product by multiplying said third information signal with a digital signal in the selected position of the third code sequence, and summing the first, second and third products to produce an output level.

14. The method of claim 1 applied to encoding additional information signals for transmission, further comprising:

generating additional code sequences comprising digital signals arranged in respective positions, the values of the digital signals of a given code sequence having a phase shifted relation to the digital signals of other code sequences, so that there are up to as many code sequences as there are possible phase shifted relations of said digital signals, wherein said output levels of said output code sequence are formed from sums of products by repeating, for corresponding selected positions in the code sequences, the steps of forming a first product by multiplying said first information signal with a digital signal in the selected position of the first code sequence, forming subsequent products by multiplying subsequent respective information signals with a digital signal in the selected position of subsequent respective code sequence, and summing the products to produce an output level.

15. The method of claim 1 applied to encoding at least third and fourth information signals for transmission in phase quadrature with said first and second information signals, further comprising producing a second output code sequence having a plurality of output levels corresponding to the number of digital signals in either of said code sequences, said output levels being formed from sums of products by repeating, for corresponding selected positions in the first and second code sequences, the steps of forming a first product by multiplying said third information signal with a digital signal in the selected position of the first code sequence, forming a second product by multiplying said fourth information signal with a digital signal in the selected position of the second code sequence, and summing the first and second products to produce an output level; and combining said output code sequences in phase quadrature.

16. The method of claim 1 expanded for encoding third and fourth information signals for transmission in phase with said first and second information signals, further comprising:

generating third and fourth code sequences having the same number of digital signals, said third and fourth code sequences, when compared in-phase to each other, or to said first and second code sequences, having near-zero cross-correlation;

producing a second output code sequence having a plurality of output levels corresponding to the number of digital signals in either of said third or fourth code sequences, said output levels being formed from sums of products by repeating, for corresponding selected positions in the third and fourth code sequences, the steps of forming a first product by multiplying said third information signal with a digital signal in the selected position of the third code sequence, forming a second product by multiplying said fourth information signal with a digital signal in the selected position of the fourth code sequence, and summing the first and second products to produce an output level; and combining said output sequences for transmission.

17. The method of claim 1 applied to a system for transmitting a broadcast signal and a subsignal without materially disturbing the broadcast signal, further comprising encoding the subsignal as an output code sequence in accordance with the method of claim 1, transmitting said broadcast signal by frequency modulation of a RF carrier, and modulating said RF carrier in response to said subsignal.

18. The method of claim 17 wherein modulating said RF carrier in response to said subsignal comprises amplitude modulating said RF carrier.

19. A method of spread-spectrum encoding at least first and second information signals, the method comprising:

generating at least first and second code sequences having the same number of digital signals, any two of said code sequences, when compared in-phase to each other, having near-zero cross-correlation;

producing an output code sequence having a plurality of output levels corresponding to the number of digital signals in any one of said code sequences, said output levels being formed from sums of products by repeating, for corresponding selected positions in the first and second code sequences, the steps of forming a first product by multiplying said first information signal with a digital signal in the selected position of the first code sequence, forming a second product by multiplying said second information signal with a digital signal in the selected position of the second code sequence, and summing the first and second products to produce an output level; and adding a synchronization pulse to said plurality of output levels.

20. The method of claim 19 wherein each said code sequence comprises:

a plurality of digital signals which form a maximal length code sequence, each code sequence including said plurality of digital signals in a different phase shifted relationship than any other of said code sequences, and an extra predetermined digital signal in the same predetermined position within each of said code sequences.

21. The method of claim 19 wherein said digital signals of said code sequences have magnitude values selected from a positive and a negative value.

22. The method of claim 19 wherein said information signals are analog signals.

23. The method of claim 19 wherein said information signals are encoded digital signals.

24. The method of claim 22 wherein said digital signals are encoded into an information signal as one of a plurality of possible analog signal levels.

25. The method of claim 24 wherein said possible analog signal levels are evenly spaced.

26. The method of claim 25 wherein three digital signals are encoded into each information signals as one of eight possible analog signal levels corresponding to the values +7, +5, +3, +1, −1, −3, −5 and −7.

27. The method of claim 24 wherein said possible analog signal levels are logarithmically spaced.

28. The method of claim 19 wherein said synchronization pulse is added prior to a first output level of said output code sequence.

29. The method of claim 19 applied to encoding at least a third information signal for transmission, further comprising:

generating a third code sequence comprising digital signals having the same number of digital signals as said first and second code sequences, any two of said first, second, and third code sequences, when compared in phase to each other, having near-zero cross-correlation;

wherein said output levels of said output code sequence are formed from sums of products by repeating, for corresponding selected positions in the first, second and third code sequences, the steps of forming a first product by multiplying said first information signal with a digital signal in the selected position of the first code sequence, forming a second product by multiplying said second information signal with a digital signal in the selected position of the second code sequence, forming a third product by multiplying said third information signal with a digital signal in the selected position of the third code sequence, and summing the first, second and third products to produce an output level.

30. The method of claim 19 applied to encoding additional information signals for transmission, further comprising:

generating additional code sequences having the same number of digital signals as said first and second code sequences, so that there are up to as many as one fewer code sequences as there are digital signals in said code sequences, any two of said code sequences, when compared in-phase to each other, having near-zero cross correlation;

wherein said output levels of said output code sequence are formed from sums of products by repeating, for corresponding selected positions in the code sequences, the steps of forming a first product by multiplying said first information signal with a digital signal in the selected position of the first code sequence, forming subsequent products by multiplying subsequent respective information signals with a digital signal in the selected position of subsequent respective code sequence, and summing the products to produce an output level.

31. The method of claim 19 applied to encoding at least third and fourth information signals for transmission in phase quadrature with said first and second information signals, further comprising producing a second output code sequence having a plurality of output levels corresponding to the number of digital signals in either of said code sequences, said output levels being formed from sums of products by repeating, for corresponding selected positions in the first and second code sequences, the steps of forming a first product by multiplying said third information signal with a digital signal in the selected position of the first code sequence, forming a second product by multiplying said fourth information signal with a digital signal in the selected position of the second code sequence, and summing the first and second products to produce an output level; and combining said output code sequences in phase quadrature.

32. The method of claim 19 expanded for encoding third and fourth information signals for transmission in phase with said first and second information signals, further comprising:

generating third and fourth code sequences having the same number of digital signals, said third and fourth code sequences, when compared in-phase to each other, or to said first and second code sequences, having near-zero cross-correlation;

producing a second output code sequence having a plurality of output levels corresponding to the number of digital signals in either of said third or fourth code sequences, said output levels being formed from sums of products by repeating, for corresponding selected positions in the third and fourth code sequences, the steps of forming a first product by multiplying said third information signal with a digital signal in the selected position of the third code sequence, forming a second product by multiplying said fourth information signal with a digital signal in the selected position of the fourth code sequence, and summing the first and second products to produce an output level; and combining said output sequences for transmission.

33. The method of claim 19 applied to a system for transmitting a broadcast signal and a subsignal without materially disturbing the broadcast signal, further comprising encoding the subsignal as an output code sequence in accordance with the method of claim 19, transmitting said broadcast signal by frequency modulation of a RF carrier, and modulating said RF carrier in response to said subsignal.

34. The method of claim 33 wherein modulating said RF carrier in response to said subsignal comprises amplitude modulating said RF carrier.

35. A method of extracting first and second information signals from a received sequence of levels, the method comprising:

generating a first code sequence comprising digital signals arranged in respective positions and having near-zero out-of-phase autocorrelation;

generating a second code sequence comprising digital signals arranged in respective positions, the values of the digital signals having a phase shifted relation to said plurality of digital signals of said first code sequence;

said first and second code sequences further comprising an extra predetermined digital signal in the same predetermined position within each of said code sequences such that said code sequences, when compared in-phase to each other, have exactly zero cross-correlation, producing first and second correlation values respectively correlating said first and second code sequences to a window of said received sequence of levels received during a time interval, said correlation values formed by multiplying a level in a selected position of said window of said received sequence of levels by a digital signal in the corresponding selected position of a code sequence to form a product, repeating said multiplying for additional selected positions in said window and said code sequence to form additional products, and summing the products to produce a correlation value; and determining a value for said first and second information signals from said first and second correlation values.

36. The method of claim 35 wherein said digital signals of said first and second code sequences comprise a maximal length code sequence.

37. The method of claim 36 wherein said digital signals have "1" or "0" values, and said extra predetermined digital signal has a "0" value, whereby exactly half of the digital signals in each code sequence have "1" values, the remainder having "0" values.

38. The method of claim 35 wherein said digital signals of said code sequences have magnitude values selected from a positive and a negative value.

39. The method of claim 35 wherein said information signals are analog signals.

40. The method of claim 35 wherein said information signals are encoded digital signals.

41. The method of claim 40 wherein said digital signals are encoded into an information signal as one of a plurality of possible analog signal levels.

42. The method of claim 41 wherein said possible analog signal levels are evenly spaced.

43. The method of claim 42 wherein three digital signals are encoded into each information signals as one of eight possible analog signal levels corresponding to the values +7, +5, +3, +1, −1, −3, −5 and −7.

44. The method of claim 41 wherein said possible analog signal levels are logarithmically spaced.

45. The method of claim 35 wherein said received sequence of levels includes a synchronization pulse, and said method further comprises:

detecting said synchronization pulse to define a reference time; and initiating said time interval at a time having a predetermined relationship to said reference time.

46. The method of claim 35 wherein the value of a said information signal is determined by comparing a said correlation value to maximum and minimum possible values of said correlation value.

47. The method of claim 35 further for extracting information signals transmitted in phase quadrature, further comprising:

separating said received sequence of levels in phase quadrature to produce first and second quadrature versions of said received sequence of levels, applying the method of claim 35 to both of said first and second quadrature versions of said received sequence to extract said information signals.

48. The method of claim 35 further for extracting third information signals, further comprising:

generating a third code sequence of digital signals having the same predetermined number of digital signals as the code sequences recited in claim 35, said third code sequence, when compared to said code sequences recited in claim 35, having near-zero cross-correlation, producing a third correlation value correlating said third code sequence to said received sequence of levels of said time interval in accordance with the multiplying, repeating and summing steps recited in claim 35, and then determining a value for said third information signal from said third correlation value.

49. The method of claim 35 applied to a system for receiving a broadcast signal and a subsignal on an RF carrier, further comprising frequency demodulating said RF carrier to receive said broadcast signal, and further demodulating said RF carrier to receive said sequence of levels.

50. The method of claim 49 wherein further demodulating said RF carrier to receive said sequence of levels comprises amplitude demodulating said carrier.

51. The method of claim 50 wherein further demodulating said RF carrier comprises logarithmically detecting said carrier to normalize gain.

52. A method of extracting first and second information signals from a received sequence of levels including a synchronization pulse, the method comprising:

generating at least first and second code sequences having the same number of digital signals, any two of said code sequences, when compared in-phase to each other, having near-zero cross-correlation;

detecting said synchronization pulse to define a reference time;

initiating a time interval at a time having a predetermined relationship to said reference time; and producing first and second correlation values respectively correlating said first and second code sequences to a window of said received sequence of levels received during said time interval, said correlation values formed by multiplying a level in a selected position of said window of said received sequence of levels by a digital signal in the corresponding selected position of a code sequence to form a product, repeating said multiplying for additional selected positions in said window and said code sequence to form additional products, and summing the products to produce a correlation value; and determining a value for said first and second information signals from said first and second correlation values.

53. The method of claim 52 wherein each said code sequence comprises:

a plurality of digital signals which form a maximal length code sequence, each code sequence including said plurality of digital signals in a different phase shifted relationship than any other of said code sequences, and an extra predetermined digital signal in the same predetermined position within each of said code sequences.

54. The method of claim 52 wherein said digital signals of said code sequences have magnitude values selected from a positive and a negative value.

55. The method of claim 52 wherein said information signals are analog signals.

56. The method of claim 52 wherein said information signals are encoded digital signals.

57. The method of claim 56 wherein said digital signals are encoded into an information signal as one of a plurality of possible analog signal levels.

58. The method of claim 57 wherein said possible analog signal levels are evenly spaced.

59. The method of claim 58 wherein three digital signals are encoded into each information signals as one of eight possible analog signal levels corresponding to the values +7, +5, +3, +1, −1, −3, −5 and −7.

60. The method of claim 57 wherein said possible analog signal levels are logarithmically spaced.

61. The method of claim 52 wherein the value of a said information signal is determined by comparing a said correlation value to maximum and minimum possible values of said correlation value.

62. The method of claim 52 further for extracting information signals transmitted in phase quadrature, further comprising:

separating said received sequence of levels in phase quadrature to produce first and second quadrature versions of said received sequence of levels, applying the method of claim 52 to both of said first and second quadrature versions of said received sequence to extract said information signals.

63. The method of claim 52 further for extracting third information signals, further comprising:

generating a third code sequence of digital signals having the same predetermined number of digital signals as the code sequences recited in claim 52, said third code sequence, when compared to said code sequences recited in claim 52, having near-zero cross-correlation, producing a third correlation value correlating said third code sequence to said received sequence of levels of said time interval in accordance with the multiplying, repeating and summing steps recited in claim 52, and then determining a value for said third information signal from said third correlation value.

64. The method of claim 52 applied to a system for receiving a broadcast signal and a subsignal on an RF carrier, further comprising frequency demodulating said RF carrier to receive said broadcast signal, and further demodulating said RF carrier to receive said sequence of levels.

65. The method of claim 64 wherein further demodulating said RF carrier to receive said sequence of levels comprises amplitude demodulating said carrier.

66. The method of claim 65 wherein demodulating said RF carrier comprises logarithmically detecting said carrier to normalize gain.

67. Apparatus for spread-spectrum encoding at least first and second information signals, comprising:

circuitry generating a first code sequence comprising digital signals arranged in respective positions and having values with near-zero out-of-phase autocorrelation; and generating a second code sequence comprising the same number of digital signals as there are in said first code sequence, arranged in respective positions, the values of the digital signals having a phase shifted relation to said digital signals of said first code sequence, said circuitry comprising a shift register, an input of said shift register being generated in response to a logical function of two or more outputs of said shift register, and circuitry for initializing said shift register with a generator code, an output of said shift register shifting out the digital signals in a selected position of each of said code sequences after said shift register is initialized with an appropriate generator code; and circuitry producing an output code sequence having a plurality of output levels corresponding to the number of digital signals in either of said code sequences, said output levels being formed from sums of products, including circuitry forming a first product by multiplying said first information signal with a digital signal in a selected position of the first code sequence, and forming a second product by multiplying said second information signal with a digital signal in a corresponding selected position of the second code sequence, comprising a single multiplier circuit responsive to said digital signals shifted out of said shift register and to said information signals, and circuitry summing the first and second products to produce an output level, comprising an accumulator accumulating products produced by said single multiplier.

68. Apparatus for spread-spectrum encoding at least first and second information signals, comprising:

circuitry generating at least first and second code sequences having the same number of digital signals, any two of said code sequences, when compared in-phase to each other, having near-zero cross-correlation;

circuitry producing an output code sequence having a plurality of output levels corresponding to the number of digital signals in any one of said code sequences, said output levels being formed from sums of products, including circuitry forming a first product by multiplying said first information signal with a digital signal in a selected position of the first code sequence, and forming a second product by multiplying said second information signal with a digital signal in a corresponding selected position of the second code sequence, and circuitry summing the first and second products to produce an output level; and circuitry adding a synchronization pulse to said output levels of said output code sequence.

69. The apparatus of claim 68 wherein said circuitry generating said first and second code sequences comprises
  a shift register, an input of said shift register being generated in response to a logical function of two or more outputs of said shift register, and
  circuitry for initializing said shift register with a generator code,
  an output of said shift register shifting out the digital signals in a selected position of each of said code sequences after said shift register is initialized with an appropriate generator code;

said circuitry forming said first and second products is a single multiplier circuit responsive to said digital signals shifted out of said shift register and to said information signals; and said circuitry summing the first and second products is an accumulator accumulating products produced by said single multiplier.

70. Apparatus for extracting first and second information signals from a received sequence of levels, comprising:

circuitry generating a first code sequence comprising digital signals arranged in respective positions and having near-zero out-of-phase autocorrelation, and generating a second code sequence comprising digital signals arranged in respective positions, the values of the digital signals having a phase shifted relation to said plurality of digital signals of said first code sequence, comprising a shift register, an input of said shift register being generated in response to a logical function of two or more outputs of said shift register, and circuitry for initializing said shift register with a generator code, an output of said shift register shifting out the digital signals of a said code sequence after said shift register is initialized with an appropriate generator code;

circuitry producing first and second correlation values respectively correlating said first and second code sequences to a window of said received sequence of levels received during a time interval, including
  circuitry multiplying a level in a selected position of said window of said received sequence of levels by a digital signal in the corresponding selected position of a code sequence to a product, comprising a buffer for storing said window of said received sequence of levels and for sequentially producing each level in said window, and a single multiplier circuit responsive to digital signals shifted out of said shift register and to levels sequentially produced by said buffer, and
  circuitry summing products to produce a correlation value, comprising an accumulator accumulating products produced by said single multiplier to produce each correlation value; and circuitry determining a value for said first and second information signals from said first and second correlation values.

71. Apparatus for extracting first and second information signals from a received sequence of levels including a synchronization pulse, comprising:

circuitry generating at least first and second code sequences having the same number of digital signals, any two of said code sequences, when compared in-phase to each other, having near-zero cross-correlation;

circuitry producing first and second correlation values respectively correlating said first and second code sequences to a window of said received sequence of levels received during a time interval, including
  circuitry detecting said synchronization pulse to define a reference time, said time interval having a predetermined relationship to said reference time,
  circuitry multiplying a level in a selected position of said window of said received sequence of levels by a digital signal in the corresponding selected position of a code sequence to form a product, and
  circuitry summing products to produce a correlation value; and determining a value for said first and second information signals from said first and second correlation values.

72. The apparatus of claim 71 wherein said circuitry generating said first and second code sequences comprises
  a shift register, an input of said shift register being generated in response to a logical function of two or more outputs of said shift register, and
  circuitry for initializing said shift register with a generator code,
  an output of said shift register shifting out the digital signals of a said code sequence after said shift register is initialized with an appropriate generator code; and said circuitry producing correlation values comprises:
  a buffer for storing said window of said received sequence of levels and for sequentially producing each level in said window, a single multiplier circuit responsive to digital signals shifted out of said shift register and to levels sequentially produced by said buffer, and an accumulator accumulating products produced by said single multiplier to produce each correlation value.

73. The apparatus of claim 67 wherein said circuitry producing said output code sequence further comprises circuitry adding a synchronization pulse to said plurality of output levels.

74. The apparatus of claim 67 adapted for transmitting a broadcast signal and said information signals without materially disturbing the broadcast signal, further comprising a transmitter transmitting said broadcast signal by frequency modulation of an RF carrier, and a modulator modulating said RF carrier in response to said output code sequence.

75. The apparatus of claim 67 wherein said plurality of digital signals of said code sequences form a maximal length code sequence, each code sequence including said plurality of digital signals in a different phase shifted relationship than any other of said code sequences, and said code sequences further comprise an extra predetermined digital signal in the same predetermined position within each of said code sequences.

76. The apparatus of claim 68 adapted for transmitting a broadcast signal and said information signals without materially disturbing the broadcast signal, further comprising a transmitter transmitting said broadcast signal by frequency modulation of an RF carrier, and a modulator modulating said RF carrier in response to said output code sequence.

77. The apparatus of claim 68 wherein said plurality of digital signals of said code sequences form a maximal length code sequence, each code sequence including said plurality of digital signals in a different phase shifted relationship than any other of said code sequences, and said code sequences further comprise an extra predetermined digital signal in the same predetermined position within each of said code sequences.

78. The apparatus of claim 70 wherein said received sequence of levels includes a synchronization pulse, and said circuitry producing said correlation values further comprises circuitry detecting said synchronization pulse to define a reference time, said time interval having a predetermined relationship to said reference time.

79. The apparatus of claim 70 adapted for receiving a broadcast signal and said information signals on an RF carrier, further comprising a receiver demodulating said RF carrier to receive said broadcast signal, and a demodulator further demodulating said RF carrier to receive said sequence of levels.

80. The apparatus of claim 70 wherein said plurality of digital signals of said code sequences form a maximal length code sequence, each code sequence including said plurality of digital signals in a different phase shifted relationship than any other of said code sequences, and said code sequences further comprise an extra predetermined digital signal in the same predetermined position within each of said code sequences.

81. The apparatus of claim 71 adapted for receiving a broadcast signal and said information signals on an RF carrier, further comprising a receiver demodulating said RF carrier to receive said broadcast signal, and a demodulator further demodulating said RF carrier to receive said sequence of levels.

82. The apparatus of claim 71 wherein said plurality of digital signals of said code sequences form a maximal length code sequence, each code sequence including said plurality of digital signals in a different phase shifted relationship than any other of said code sequences, and said code sequences further comprise an extra predetermined digital signal in the same predetermined position within each of said code sequences.

* * * * *